United States Patent
Hiyama et al.

(10) Patent No.: US 7,500,015 B2
(45) Date of Patent: Mar. 3, 2009

(54) MOBILE TRACKING SYSTEM FOR QOS GUARANTEED PATHS, ROUTER DEVICE USED FOR THIS SYSTEM, MOBILE COMMUNICATIONS TERMINAL, AND CONTROL PROGRAM FOR CONTROLLING ROUTER DEVICE

(75) Inventors: Satoshi Hiyama, Yokohama (JP); Kenji Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 705 days.

(21) Appl. No.: 10/310,798

(22) Filed: Dec. 6, 2002

(65) Prior Publication Data
US 2003/0110290 A1 Jun. 12, 2003

(30) Foreign Application Priority Data
Dec. 12, 2001 (JP) ............................. 2001-379210
Jan. 28, 2002 (JP) ............................. 2002-018915

(51) Int. Cl.
*G06F 15/173* (2006.01)
(52) U.S. Cl. .................. 709/242; 709/226; 709/230; 709/238; 370/331
(58) Field of Classification Search .................. 709/223, 709/25, 27, 230, 38, 240, 42, 45, 217, 225, 709/227, 238, 242, 245, 226; 370/328, 331
See application file for complete search history.

(56) References Cited

U.S. PATENT DOCUMENTS 5,412,654 A * 5/1995 Perkins ........................ 370/312
5,953,312 A * 9/1999 Crawley et al. .............. 370/218
6,256,300 B1 * 7/2001 Ahmed et al. ................ 370/331
6,347,078 B1 * 2/2002 Narvaez-Guarnieri et al. ............................ 370/230
6,434,134 B1 * 8/2002 La Porta et al. .............. 370/338
6,957,262 B2 * 10/2005 Kimura et al. ............... 709/227
6,958,988 B1    10/2005 Okagawa et al.

FOREIGN PATENT DOCUMENTS

CN              1317213           10/2001

OTHER PUBLICATIONS

B. Jamoussi, et al., "Constraint-Based LSP Setup Using LDP" Internet-draft, draft-ietf-mpls-cr-ldp-06. Text, Nov. 2001.
D. O. Awduche, et al., "RSVP-TE: Extensions to RSVP for LSP Tunnels" Internet-draft, draft-ietf-mpls-rsvp-lsp-tunnel-09. Text, Aug. 2001.
R. Braden, et al., "Resource ReSerVation Protocol (RSVP)" RFC2205, Sep. 1997.

(Continued)

*Primary Examiner*—Saleh Najjar
*Assistant Examiner*—Faruk Hamza
(74) *Attorney, Agent, or Firm*—Crowell & Moring LLP

(57) ABSTRACT

To always guarantee QoS for packet transfer and to achieve continuity of QoS guaranteed paths for upstream and downstream packet transfers between a mobile communications terminal and remote terminal, a transit router TR is used to detect any change of visitor location address reported via an existing QoS guaranteed path used for packet transfer and to newly set up a QoS guaranteed path according to the results of detection. Packets are transferred via existing QoS guaranteed paths until the transit router TR completes setup of a QoS guaranteed path. The mobile communications terminal and remote terminal are notified that the setup of the QoS guaranteed path is completed.

5 Claims, 16 Drawing Sheets

OTHER PUBLICATIONS

C. Perkins, et al., "IP Mobility Support" RFC2002, Oct. 1996.
D. B. Johnson, et al., "Mobility Support in IPv6" Internet-draft. Draft-ietf-mobileip-ipv6-15. Text, Jul. 2001.
J. K. Choi, et al., "Mobile IPv6 support in MPLS Network" Internet-draft, draft-choi-mobileip-ipv6-mpls-01. Text, Aug. 2001.
Kim, Heechang et al.: *Mobility-aware MPLS in IP-based wireless access networks*; Global Telecommunications Conference, 2001. Globecom '01. IEEE, vol. 6, Nov. 25, 2001, pp. 3444-3448, XP002304869.
S. Yasukawa, et al., A Route Optimization Method and Smooth Hand Over Method With RSVP Signaling in a Mobile IBv6 Network, p. 144 B-6-88, Aug. 2001. (Partial Translation).
Japanese Office Action dated May 23, 2006.
Chinese Official Action dated Mar. 25, 2005.

\* cited by examiner

MOBILE TRACKING SYSTEM FOR QOS GUARANTEED PATHS, ROUTER DEVICE USED FOR THIS SYSTEM, MOBILE COMMUNICATIONS TERMINAL, AND CONTROL PROGRAM FOR CONTROLLING ROUTER DEVICE

BACKGROUND OF THE INVENTION

1. Field of the Invention

The present invention relates to a mobile tracking system for QoS guaranteed paths, a router device used for this system, a mobile communications terminal, and a control program for controlling a router device. More particularly, it relates to a communications system which transfers packets to/from a mobile communications terminal via QoS guaranteed paths, a router device used for this system, a mobile communications terminal, and a control program for controlling the router device.

2. Description of the Related Art

Known technologies intended to provide high-quality services on communications networks such as the Internet include MPLS (Multi-protocol Label Switching) and RSVP (Resource Reservation Protocol) which set up a QoS (Quality of Service) guaranteed path with a guaranteed band width between communications terminals. MPLS is described, for example, in a document by B. Jamoussi, et al. "Constraint-Based LSP Setup using LDP," Internet-draft, draft-ietf-mpls-cr-ldp-06.txt, November 2001 (hereinafter referred to as document 1) and a document by D. O. Awduche, et al. "RSVP-TE: Extensions to RSVP for LSP Tunnels," Internet-draft, draft-ietf-mpls-rsvp-lsp-tunnel-09.txt, August 2001 (hereinafter referred to as document 2).

Also, RSVP is described, for example, in a document by R. Braden, et al. "Resource ReSerVation Protocol (RSVP)," RFC2205, September 1997 (hereinafter referred to as document 3).

On the other hand, known technologies intended to provide packet reachability to mobile communications terminals on communications networks include for example Mobile IP. Mobile IP is described in a document by C. Perkins "IP Mobility Support," RFC2202, Octtober 1996 (hereinafter referred to as document 4) and a document by D. B. Johnson, et al. "Mobility Support in IPv6," Internet-draft, draft-ietf-mobileip-ipv6-15.txt, July 2001 (hereinafter referred to as document 5).

However, MPLS (documents 1 and 2) and RSVP (document 3), which are intended for use on fixed networks, are not capable of tracking a QoS guaranteed path when communications terminals are mobile. Also, Mobile IP (documents 4 and 5), which provides only packet reachability to mobile communications terminals, is not capable of packet transfer with QoS guarantees.

Known technologies for solving this problem includes a mobile tracking system for QoS guaranteed paths which is intended to provide both QoS guarantees for packet transfer according to MPLS and packet reachability according to Mobile IP. This is described in a document by J. K. Choi, et al. "Mobile IPv6 support in MPLS Network," Internet-draft, draft-choi-mobileip-ipv6-mpls-01.txt, August 2001 (hereinafter referred to as document 6).

Problems with the conventional mobile tracking system for QoS guaranteed paths described in document 6 will be described with reference to FIGS. 15 and 16.

First, suppose a communications network 100 comprises edge routers ER1 to ER 3 and core routers CR1 and CR2, as shown in FIG. 15. Also, let's assume that a mobile communications terminal 200 is conducting packet transmission with a remote terminal 300 (corresponding terminal) via this network 100.

In this active state of communication, if the mobile communications terminal 200 moves from its original position in an old visitor location area A1 to an area A12 in which the coverage area of the edge router ER1 and the coverage area of the edge router ER2 overlap, operations such as those shown in a sequence diagram in FIG. 16 are carried out.

In FIG. 16, when a packet S1 is transmitted between the mobile communications terminal 200 and remote terminal 300 via an existing QoS guaranteed path P0, if information S2 about a new visitor location address (router advertisement) is received from the edge router ER2 which belongs to a new visitor location area A2, the mobile communications terminal 200 transfers an upstream packet S3 containing a location registration update request (binding update) and desired QoS parameter to the remote terminal 300 using the new address.

The packet S3 received by the edge router ER2 which belongs to the new visitor location area A2 is transferred on a best-effort basis via a path without a QoS guarantee until a new QoS guaranteed path has been set up. Meanwhile, the edge router ER2 which belongs to the new visitor location area A2 sends out a new-QoS-guaranteed-path setup request S4 to the edge router ER3 on the side of the remote terminal 300 and starts setting up a new QoS guaranteed path.

Upon receiving the packet S3 containing a location registration update request and QoS parameter from the mobile communications terminal 200, the remote terminal 300 updates its own table containing correspondence between the address unique to the mobile communications terminal 200 and visitor location address. This enables a downstream packet S6 to be transferred to the new visitor location address via a path between the edge router ER2 and edge router ER3.

At this time, if the edge router ER2 which belongs to the new visitor location area has received a new-QoS-guaranteed-path setup acknowledgment S5 from the edge router ER3 on the side of the remote terminal 300, packet transfer can be performed via a new QoS guaranteed path P1. However, if the edge router ER2 which belongs to the new visitor location area has not received a new-QoS-guaranteed-path setup acknowledgment S5 from the edge router ER3 on the side of the remote terminal 300, the packet transfer to the new visitor location address of the mobile communications terminal 200 is performed on a best-effort basis without a QoS guarantee.

That is, in the system shown in FIG. 15, upstream packets are transferred on a best-effort basis until a new QoS guaranteed path has been set up. On the other hand, downstream packets are transferred via an existing path with QoS guarantees until a location registration update request signal is received. After a location registration update request signal is received, they are transferred on a best-effort basis until a new QoS guaranteed path has been set up.

Thus, the conventional mobile tracking system for QoS guaranteed paths has the problem that it cannot control upstream and downstream packet transfer paths and cannot always transfer packets with QoS guarantees.

Also, the conventional system has the problem that it cannot setup a new QoS guaranteed path correctly when terminals communicating with each other move simultaneously. This problem will be described with reference to FIGS. 17 and 18. FIG. 17 is a block diagram illustrating this problem, wherein components equivalent to those in FIG. 15 are denoted by the same reference numerals/characters as corresponding components in FIG. 15.

In FIG. 17, let's assume that the mobile communications terminal 200 moves from the visitor location area A1 of the edge router ER1 to the new visitor location area A2 of the edge router ER2. In relation to this movement, the edge router ER2 sets up a new QoS guaranteed path toward the edge router ER3.

Almost simultaneously with the movement of the mobile communications terminal 200, a mobile communications terminal 400 moves from a visitor location area B1 of the edge router ER3 to a new visitor location area B2 of an edge router ER4. Then, an edge router ER4 sets up a new QoS guaranteed path toward the edge router ER1.

When new QoS guaranteed paths are set up almost simultaneously as described above, operations shown in a sequence diagram in FIG. 18 are carried out.

In FIG. 18, when a packet S1 is transmitted between the mobile communications terminal 200 and mobile communications terminal 400 via an existing QoS guaranteed path P0, if information S2 about a new visitor location address is received from the edge router ER2 which belongs to a new visitor location area A2, the mobile communications terminal 200 transfers an upstream packet S3 containing a location registration update request and desired QoS parameter to the mobile communications terminal 400 using the new address. The packet S3 received by the edge router ER2 which belongs to the new visitor location area A2 is transferred on a best-effort basis via a path without a QoS guarantee until a new QoS guaranteed path has been set up. Meanwhile, the edge router ER2 which belongs to the new visitor location area A2 sends out a new-QoS-guaranteed-path setup request S4 to the edge router ER3 on the side of the mobile communications terminal 400 and starts setting up a new QoS guaranteed path.

Almost simultaneously with the movement of the mobile communications terminal 200, if information S2' about a new visitor location address is received from the edge router ER4 which belongs to the new visitor location area B2, the mobile communications terminal 400 transfers an upstream packet S3' containing a location registration update request and desired QoS parameter to the mobile communications terminal 200 using the new address. The packet S3' received by the edge router ER4 which belongs to the new visitor location area B2 is transferred on a best-effort basis via a path without a QoS guarantee until a new QoS guaranteed path has been set up. Meanwhile, the edge router ER4 which belongs to the new visitor location area B2 sends out a new-QoS-guaranteed-path setup request S4' to the edge router ER1 on the side of the mobile communications terminal 200 and starts setting up a new QoS guaranteed path.

Subsequently, if the edge router ER2 which belongs to the new visitor location area of the mobile communications terminal 200 has received a new-QoS-guaranteed-path setup acknowledgment S5 from the edge router ER3 on the side of the mobile communications terminal 400, a new QoS guaranteed path P1 will be set up. On the other hand, if the edge router ER4 which belongs to the new visitor location area of the mobile communications terminal 400 has received a new-QoS-guaranteed-path setup acknowledgment S5' from the edge router ER1 on the side of the mobile communications terminal 200, a new QoS guaranteed path P1' will be set up. In short, the QoS guaranteed path P1 is set up between the edge router ER2 and edge router ER3 while the other QoS guaranteed path P1' is set up between the edge router ER1 and edge router ER4.

As described above, there is the problem that when terminals communicating with each other move simultaneously, a new QoS guaranteed path cannot be set up between the edge router ER2 and edge router ER4.

The present invention has been made to solve the above prior art problems. Its object is to provide a mobile tracking system for QoS guaranteed paths which can always guarantee QoS and can achieve continuity of QoS guaranteed paths for upstream and downstream packet transfers, a router device used for this system, a mobile communications terminal, and a control program for controlling the router device.

SUMMARY OF THE INVENTION

The mobile tracking system set forth in claim 1 of the present invention is a mobile tracking system for QoS guaranteed paths which carries out packet transfer via QoS guaranteed paths between a first communications terminal and a second communications terminal at least one of which is a mobile terminal, wherein the above described mobile tracking system: uses a router device which comprises detection means for detecting any change of visitor location address reported via an existing QoS guaranteed path used for the above described packet transfer and QoS guaranteed path setup means for newly setting up a QoS guaranteed path according to detection results produced by the detection means; and transfers packets via the above described existing QoS guaranteed path until the QoS guaranteed path setup means of the above described router device completes setup of a QoS guaranteed path.

The mobile tracking system set forth in claim 2 of the present invention is the mobile tracking system according to claim 1, further comprising QoS-guaranteed-path setup complete notification means for notifying the above described first communications terminal and the above described second communications terminal that the above described QoS guaranteed path setup means has completed setup of a QoS guaranteed path.

The mobile tracking system set forth in claim 3 of the present invention is the mobile tracking system according to claim 1 or 2, further comprising change notification means for sending out to a router device other than the above described router device a notification about a change of relay instead of setting up a QoS guaranteed path using the above described QoS guaranteed path setup means, depending on the detection results produced by the above described detection means, wherein the above described other router device newly sets up a QoS guaranteed path.

The mobile tracking system set forth in claim 4 of the present invention is the mobile tracking system according to claim 2 or 3, wherein before receiving notification from the above described QoS-guaranteed-path setup complete notification means, the above described first communications terminal saves the above described changed visitor location address and transfers packets via the above described existing QoS guaranteed path.

The mobile tracking system set forth in claim 5 of the present invention is the mobile tracking system according to any of claims 1 to 4, wherein the above described first communications terminal associates an address unique to the above described second communications terminal with the above described changed visitor location address.

The router device set forth in claim 4 of the present invention is a router device for carrying out packet transfer via QoS guaranteed paths between a first communications terminal and a second communications terminal at least one of which is a mobile terminal, comprising: detection means for detecting any change of visitor location address reported via an existing QoS guaranteed path used for the above described packet transfer; and QoS guaranteed path setup means for newly setting up a QoS guaranteed path according to detection results produced by the detection means.

The router device may further comprise change notification means for sending out to another router device a notification about a change of relay instead of setting up a QoS guaranteed path using the above described QoS guaranteed path setup means, depending on the detection results produced by the above described detection means.

The router device may further comprise a table for setting up QoS guaranteed paths by associating addresses unique to communications terminals with visitor location addresses, wherein the above described router device transfers packets via the above described existing QoS guaranteed path until the QoS guaranteed path setup means completes setup of a QoS guaranteed path.

The router device may further comprise QoS-guaranteed-path setup complete notification means for notifying the above described first communications terminal and the above described second communications terminal that the above described QoS guaranteed path setup means has completed setup of a QoS guaranteed path.

The mobile communications terminal may carry out packet transfer to/from another communications terminal using a QoS guaranteed path, wherein before a QoS-guaranteed-path setup complete notification is received from a router device, a changed visitor location address is saved and packets are transferred via an existing QoS guaranteed path.

The mobile communications terminal may have an address unique to the above described other communications terminal is associated with the above described changed visitor location address.

A control program for controlling a router device carries out packet transfer via QoS guaranteed paths between a first communications terminal and a second communications terminal at least one of which is a mobile terminal, the above described control program comprising: a detection step of detecting any change of visitor location address reported via an existing QoS guaranteed path used for the above described packet transfer; and a QoS guaranteed path setup step of newly setting up a QoS guaranteed path according to detection results produced in the detection step.

The control program may further comprise a QoS-guaranteed-path setup complete notification step of notifying the above described first communications terminal and the above described second communications terminal that the above described QoS guaranteed path setup step has completed setup of a QoS guaranteed path.

The control program may further comprise a change notification step of sending out to another router device a notification about a change of relay instead of setting up a QoS guaranteed path in the above described QoS guaranteed path setup step, depending on the detection results produced in the above described detection step.

In short, any router located in any overlapping segment between the packet transfer paths before and after movement of a mobile communications terminal is defined as a transit router, then it is determined whether this transit router has set up a new QoS guaranteed path, and if a new QoS guaranteed path has been set up, the mobile communications terminal and remote terminal are notified. Until this notification is received, the mobile communications terminal and remote terminal transfer packets via an existing QoS guaranteed path.

DETAILED DESCRIPTION OF THE PREFERRED EMBODIMENTS

Figure 1:
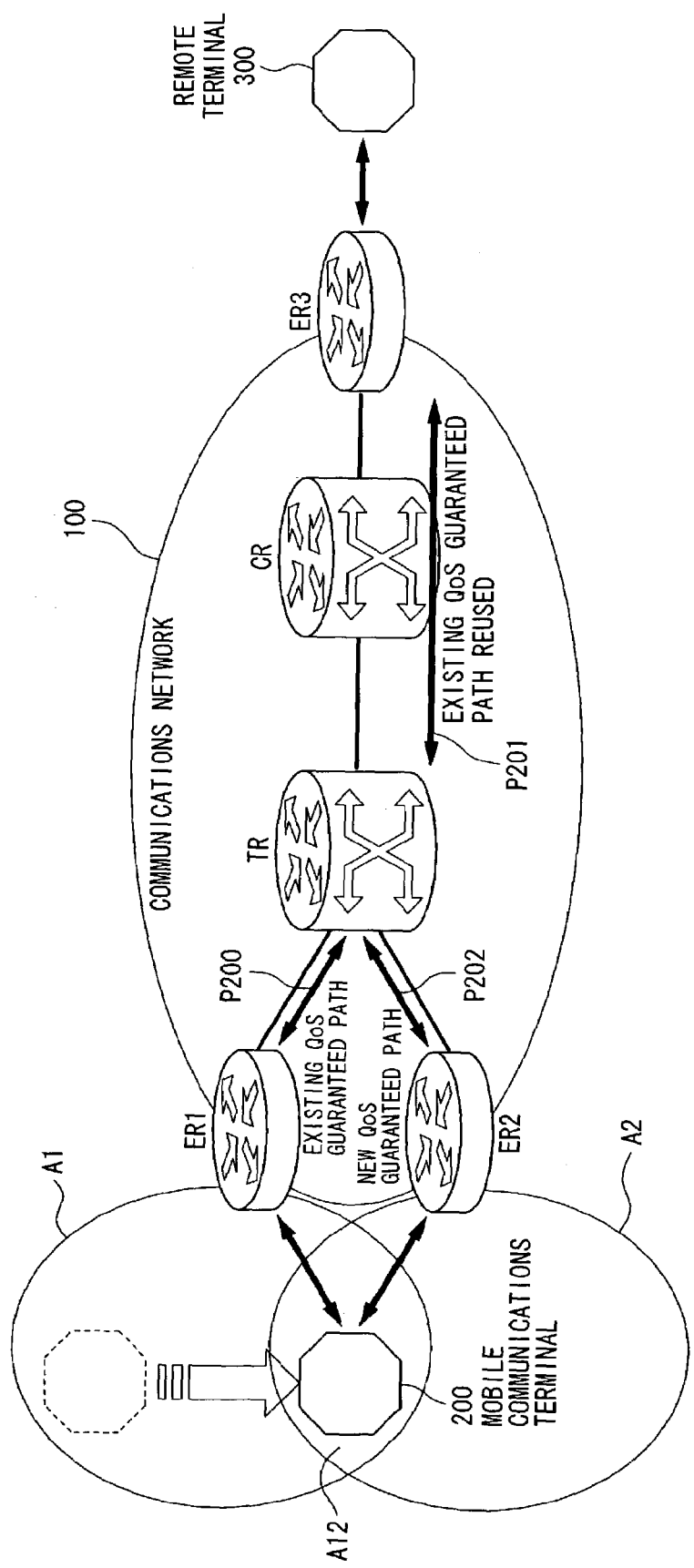
FIG. 1 is a block diagram showing a configuration of a first example of a mobile tracking system for QoS guaranteed paths according to the present invention.

Next, an embodiment of the present invention will be described with reference to the drawings. Regarding the drawings referred to in the following description, equivalent components in different drawings are denoted by the same reference numerals/characters.

FIRST EXAMPLE

FIG. 1 is a block diagram showing a configuration of a first example of a mobile tracking system for QoS guaranteed paths according to the present invention. As shown in the figure, in the mobile tracking system for QoS guaranteed paths according to this example, any router located in any overlapping segment between the packet transfer paths before and after movement of a mobile communications terminal is defined as a transit router TR.

Referring to FIG. 1, the mobile tracking system for QoS guaranteed paths according to this example carries out packet transfer, through a network 100, between a mobile communications terminal 200 and a remote terminal 300, each comprising packet transfer control capabilities. The network 100 according to this example comprises a transit router TR which is any router located in any overlapping segment between the packet transfer paths before and after movement of the mobile communications terminal 200, a core router CR, and edge routers ER1 to ER3.

The edge router ER1, which belongs to a visitor location area A1, sends and receives packets to/from a mobile communications terminal in the visitor location area A1. The edge router ER2, which belongs to a visitor location area A2, sends and receives packets to/from a mobile communications terminal in the visitor location area A2. The edge router ER3 sends and receives packets to/from the remote terminal 300.

Regarding this system with the above configuration, a setup process of a QoS guaranteed path will be described, and then a handover process of a mobile communications terminal will be described.

(Setup Process of QoS Guaranteed Path Before Handover)

Figure 2:
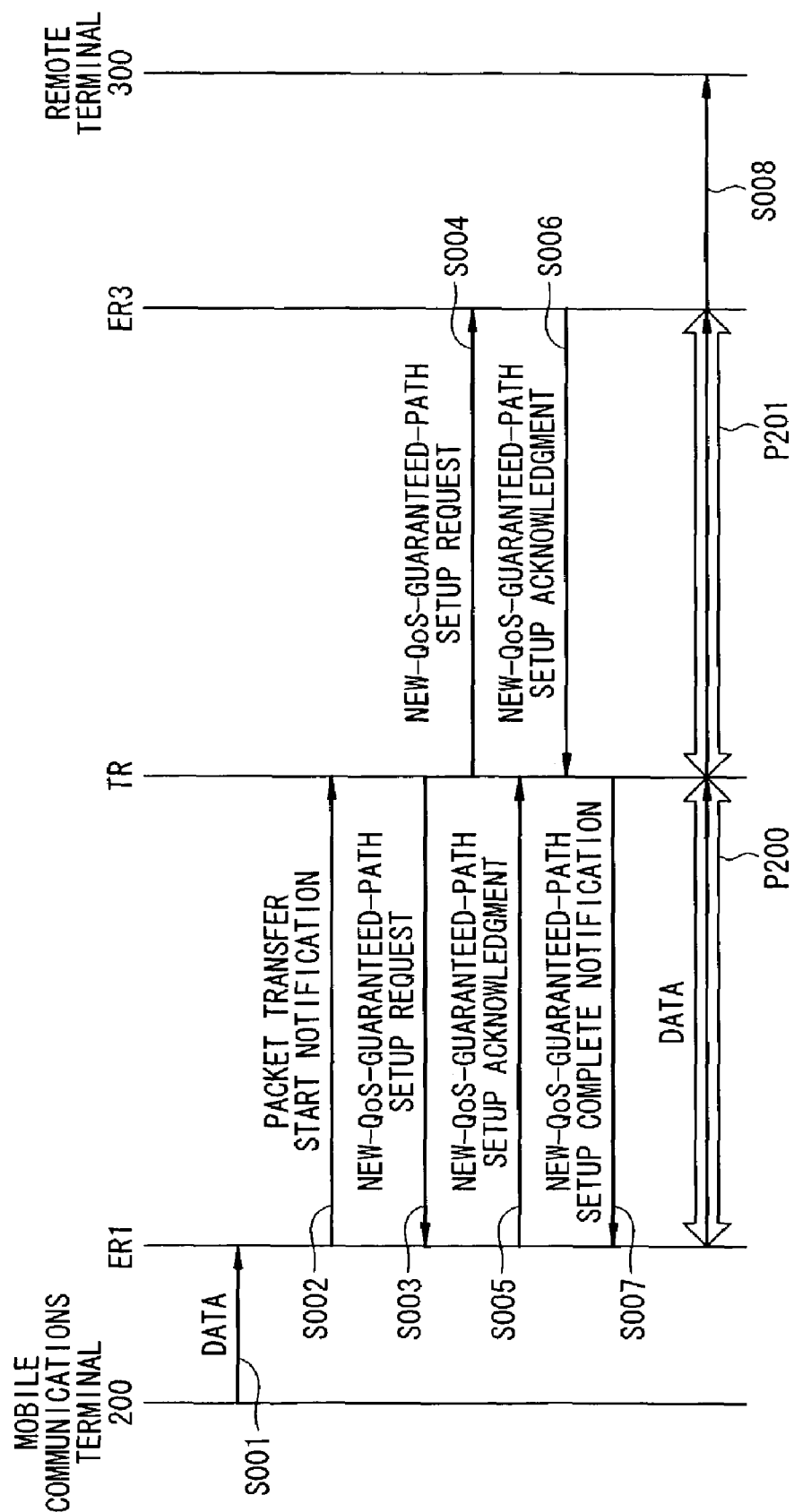
FIG. 2 is a sequence diagram showing operations performed by the system shown in FIG. 1 to set up a QoS guaranteed path.

First, with reference to a sequence diagram in FIG. 2, description will be given of operations performed after communication is started with the mobile communications terminal 200 sending an upstream packet S001 to the remote terminal 300. In the figure, when communication is started with the mobile communications terminal 200 sending the upstream packet S001 to the remote terminal 300, the edge router ER1 which receives the packet S001 buffers it temporarily and sends the transit router TR a notification S002 that packet transfer is started. Upon receiving the notification S002, the transit router TR sends new-QoS-guaranteed-path setup requests S003 and S004 to the notifying edge router ER1 and the edge router ER3 on the side of the remote terminal 300, respectively, and starts setting up a new QoS guaranteed path. Upon receiving new-QoS-guaranteed-path setup acknowledgments S005 and S006, respectively, from the edge router ER1 and edge router ER3, the transit router TR sends a new-QoS-guaranteed-path setup complete notification S007 to the edge router ER1 on the side of the mobile communications terminal 200. Upon receiving the notification, the edge router ER1 on the side of the mobile communications terminal 200 starts transferring the buffered upstream packet S008 (the same as the upstream packet S001 described above) to the remote terminal 300.

When communication is started with the remote terminal 300 sending a downstream packet to the mobile communications terminal 200, if the visitor location address of the mobile communications terminal 200 is known to the remote terminal 300, a QoS guaranteed path is set up as with the above case.

Figure 3:
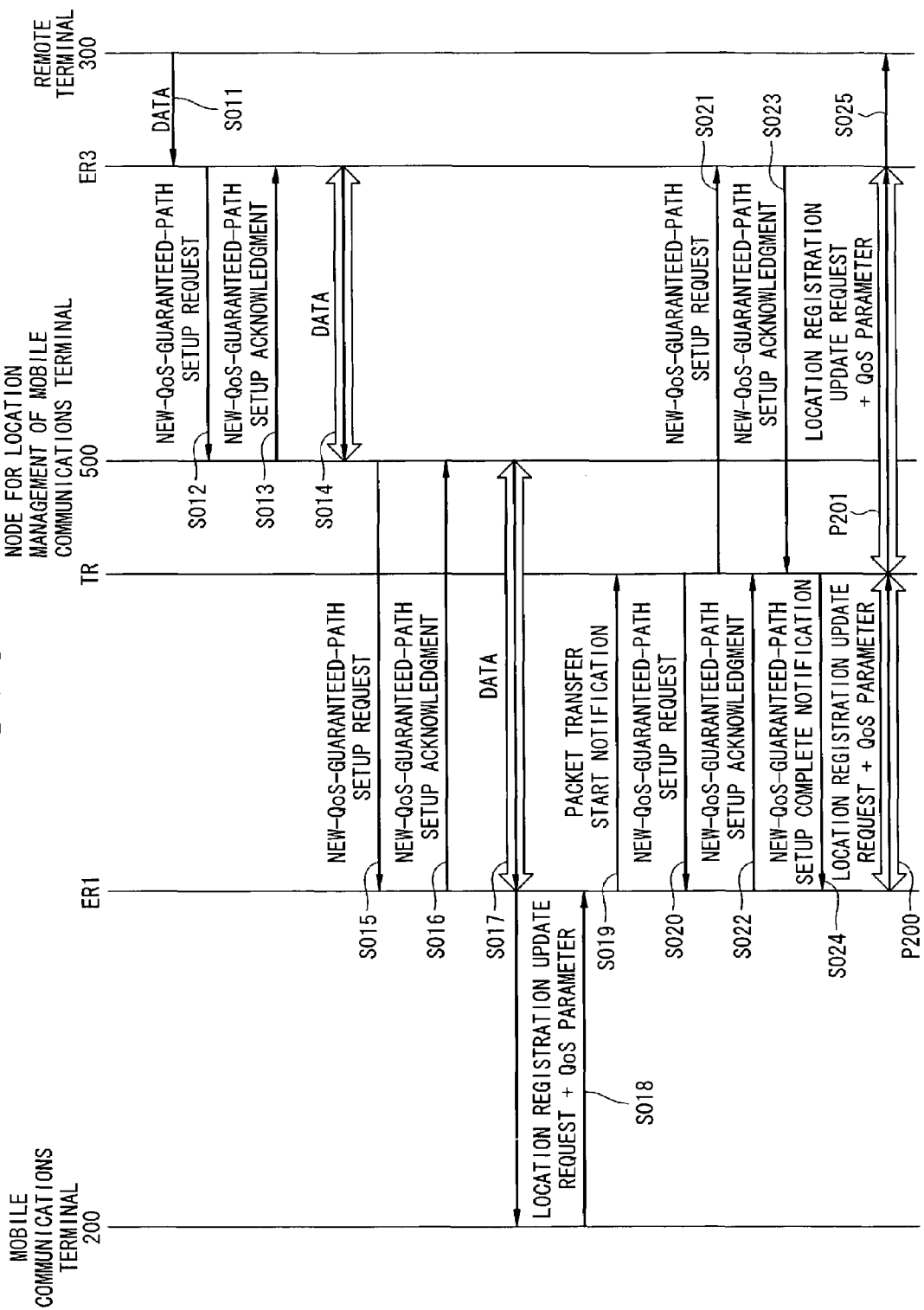
FIG. 3 is a sequence diagram showing operations performed by the system shown in FIG. 1 to set up a QoS guaranteed path.

Now, operations performed when the visitor location address is unknown will be described with reference to a sequence diagram in FIG. 3. In the figure, upon receiving a downstream packet S011, the edge router ER3 buffers it temporarily and sends a new-QoS-guaranteed-path setup request S012 to a node 500 (e.g., home location register or home agent) which manages the location of the mobile communications terminal 200. Upon receiving a new-QoS-guaranteed-path setup acknowledgment S013 from the node which manages the location of the mobile communications terminal 200, the edge router ER3 transfers a downstream packet S014 (the same as the downstream packet S011 described above) to the node 500 which manages the location of the mobile communications terminal 200. Upon receiving the packet S014, the node 500 which manages the location sends a new-QoS-guaranteed-path setup request S015 to the edge router ER1 on the side of the mobile communications terminal 200. Upon receiving the new-QoS-guaranteed-path setup request S015, the edge router ER1 sends a new-QoS-guaranteed-path setup acknowledgment S016.

Upon receiving the new-QoS-guaranteed-path setup acknowledgment S016 from the edge router ER1 on the side of the mobile communications terminal 200, the node 500 which manages the location transfers a downstream packet S017 (the same as the downstream packet S011 described above) to the visitor location address of the mobile communications terminal 200. Upon receiving the packet from the node 500 which manages the location, the mobile communications terminal 200 sends an upstream packet S018 containing a location registration update request and desired QoS parameter to the remote terminal 300. Upon receiving the packet S018, the edge router ER1 buffers it temporarily and sends the transit router TR a notification S019 that packet transfer is started. Upon receiving the notification S019, the transit router TR sends new-QoS-guaranteed-path setup requests S020 and S021 to the notifying edge router ER1 and the edge router ER3 on the side of the remote terminal 300, respectively, and starts setting up a new QoS guaranteed path. Upon receiving new-QoS-guaranteed-path setup acknowledgments S022 and S023, respectively, from the edge router ER1 and edge router ER3, the transit router TR sends a new-QoS-guaranteed-path setup complete notification S024 to the edge router ER1 on the side of the mobile communications terminal 200. Upon receiving the notification, the edge router ER1 on the side of the mobile communications terminal 200 starts transferring the buffered upstream packet S025 (the same as the upstream packet S018 described above) to the remote terminal 300.

Incidentally, if the mobile communications terminal 200 or remote terminal 300 which is powered on but not in an active state of communication sends a message packet before data packet transmission to notify the network that it will enter an active state of communication, the transit router TR which receives the packet can set up a new QoS guaranteed path for the edge router ER1 on the side of the mobile communications terminal 200 or the edge router ER3 on the side of the remote terminal 300.

The paths thus set up constitute QoS guaranteed paths P200 and P201 shown in FIG. 1.

(Processing for Handover)

In the system where the QoS guaranteed paths P200 and P201 has been set up, when the mobile communications terminal 200 moves to an area A12 where the coverage areas of the edge routers ER1 and ER2 overlap and receives information about a new visitor location address from the edge router ER2 which belongs to the new visitor location area it moved to, it transfers an upstream packet which contains a location registration update request and desired QoS parameter using the old visitor location address used before the movement while storing the new visitor location address.

The packet received by the edge router ER1 which belongs to the old visitor location area is transferred via existing QoS guaranteed paths. By checking the new visitor location address contained in the packet, the transit router TR which relays this packet can judge whether the mobile communications terminal 200 is traveling in the service area of the transit router TR. When it is confirmed that the movement is taking place in its service area, the transit router TR sends out a new-QoS-guaranteed-path setup request to the edge router ER2 which belongs to a new visitor location area and starts setting up a new QoS guaranteed path.

If the remote terminal 300 has not received a new-QoS-guaranteed-path setup complete notification from the transit router TR by the time it receives the upstream packet which contains a location registration update request and QoS parameter from the mobile communications terminal 200, it temporarily stores the new visitor location address contained in the packet and uses existing QoS guaranteed paths to transfer downstream packets. Upon receiving a new-QoS-guaranteed-path setup acknowledgment from the edge router ER2 which belongs to the new visitor location area, the transit router TR recognizes that the new QoS guaranteed path has been set up and sends a setup complete notification to the mobile communications terminal 200 and the remote terminal 300.

Upon receiving the setup complete notification, the mobile communications terminal 200 transfers an upstream packet via the new QoS guaranteed path using the new visitor location address. On the other hand, upon receiving the setup complete notification, the remote terminal 300 updates its own table containing correspondence between the address unique to the mobile communications terminal 200 and visitor location address and transfers a downstream packet via the new QoS guaranteed path.

Thus, in this system, upstream and downstream packets are transferred via an existing QoS guaranteed path until setup of a new QoS guaranteed path is completed. The path used for upstream and downstream packet transfer is switched to the new QoS guaranteed path only after the setup is completed.

Figure 4:
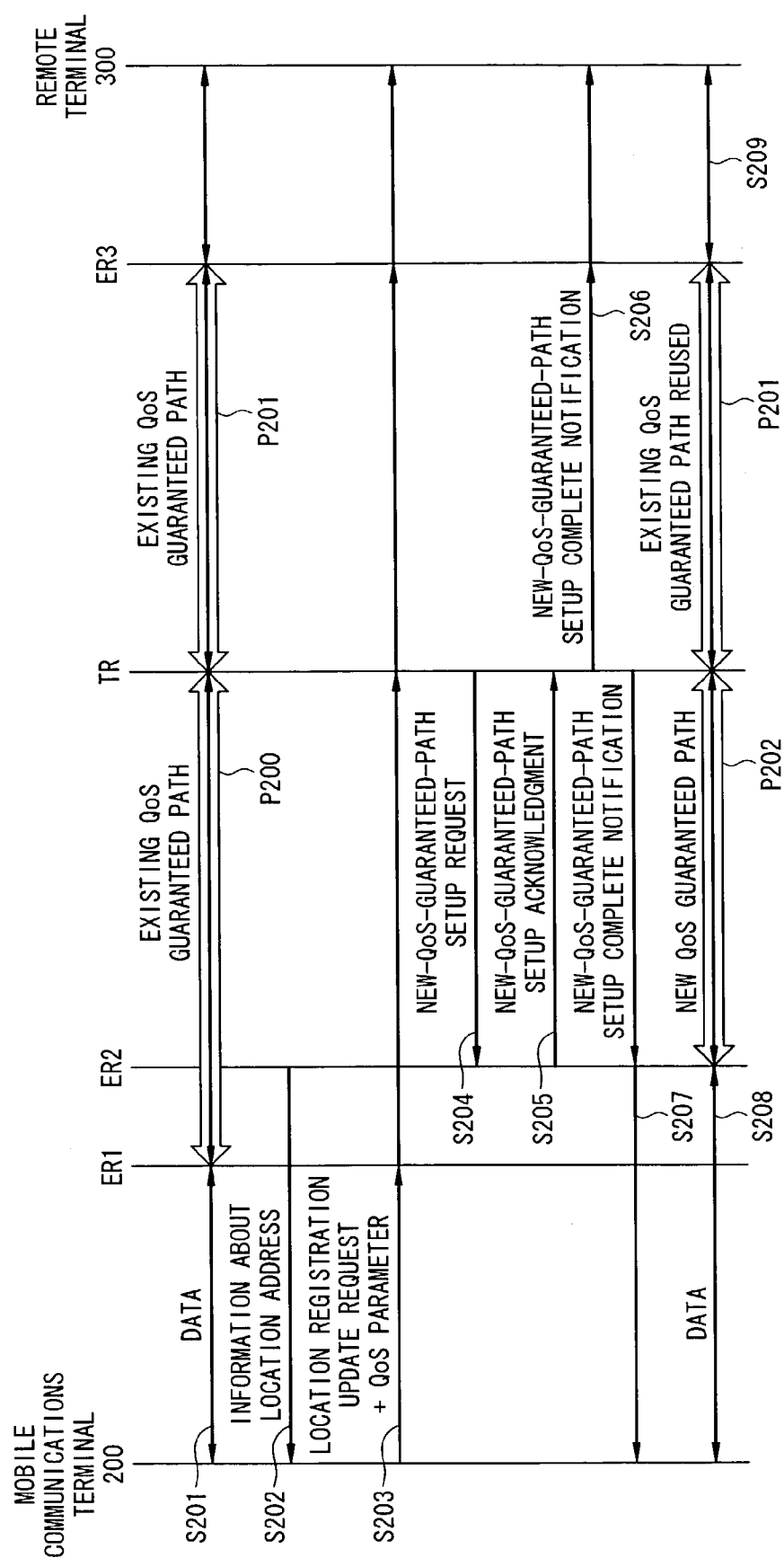
FIG. 4 is a sequence diagram showing operations performed by components of the system shown in FIG. 1 when a handover takes place.

Operations performed in this system will be described further with reference to FIG. 4 as well. In FIG. 4, the mobile communications terminal 200 and remote terminal 300 transmit data by sending and receiving a packet S201 via the existing QoS guaranteed paths P200 and P201.

In this state, when the mobile communications terminal 200 moves into the area where the coverage areas of the edge routers ER1 and ER2 overlap, it receives information S202 about a new visitor location address from the edge router ER2 belonging to the new visitor location area it moved to, it stores the new visitor location address. And the mobile communications terminal 200 transfers an upstream packet S203 which contains a location registration update request and desired QoS parameter using the old visitor location address used before the movement.

The packet S203 received by the edge router ER1 which belongs to the old visitor location area is transferred via the existing QoS guaranteed paths P200 and P201. By checking the new visitor location address contained in the packet S203, the transit router TR which relays this packet S203 judges whether the mobile communications terminal 200 is traveling in the service area of the transit router TR. When it is confirmed that the movement of the mobile communications terminal 200 is taking place in its service area, the transit router TR sends out a new-QoS-guaranteed-path setup request S204 to the edge router ER2 which belongs a new visitor location area and starts setting up a new QoS guaranteed path.

If the remote terminal 300 has not received a new-QoS-guaranteed-path setup complete notification from the transit router TR by the time it receives the upstream packet S203 which contains a location registration update request and QoS parameter from the mobile communications terminal, it temporarily stores the new visitor location address contained in the packet S203 and uses the existing QoS guaranteed paths P200 and P201 to transfer downstream packets from the remote terminal 300. Upon receiving a new-QoS-guaranteed-path setup acknowledgment S205 from the edge router ER2 which belongs to the new visitor location area, the transit router TR recognizes that the new QoS guaranteed path has been set up and sends setup complete notifications S206 and S207 to the remote terminal 300 and the mobile communications terminal 200, respectively.

Upon receiving the setup complete notification S207, the mobile communications terminal 200 transfers an upstream packet S208 via the new QoS guaranteed path P202 using the new visitor location address and via the existing QoS guaranteed path P201. On the other hand, upon receiving the setup complete notification S206, the remote terminal 300 updates its own table containing correspondence between the address unique to the mobile communications terminal 200 and visitor location address and transfers a downstream packet S209 via the new QoS guaranteed path and existing QoS guaranteed path P201.

Figure 5:
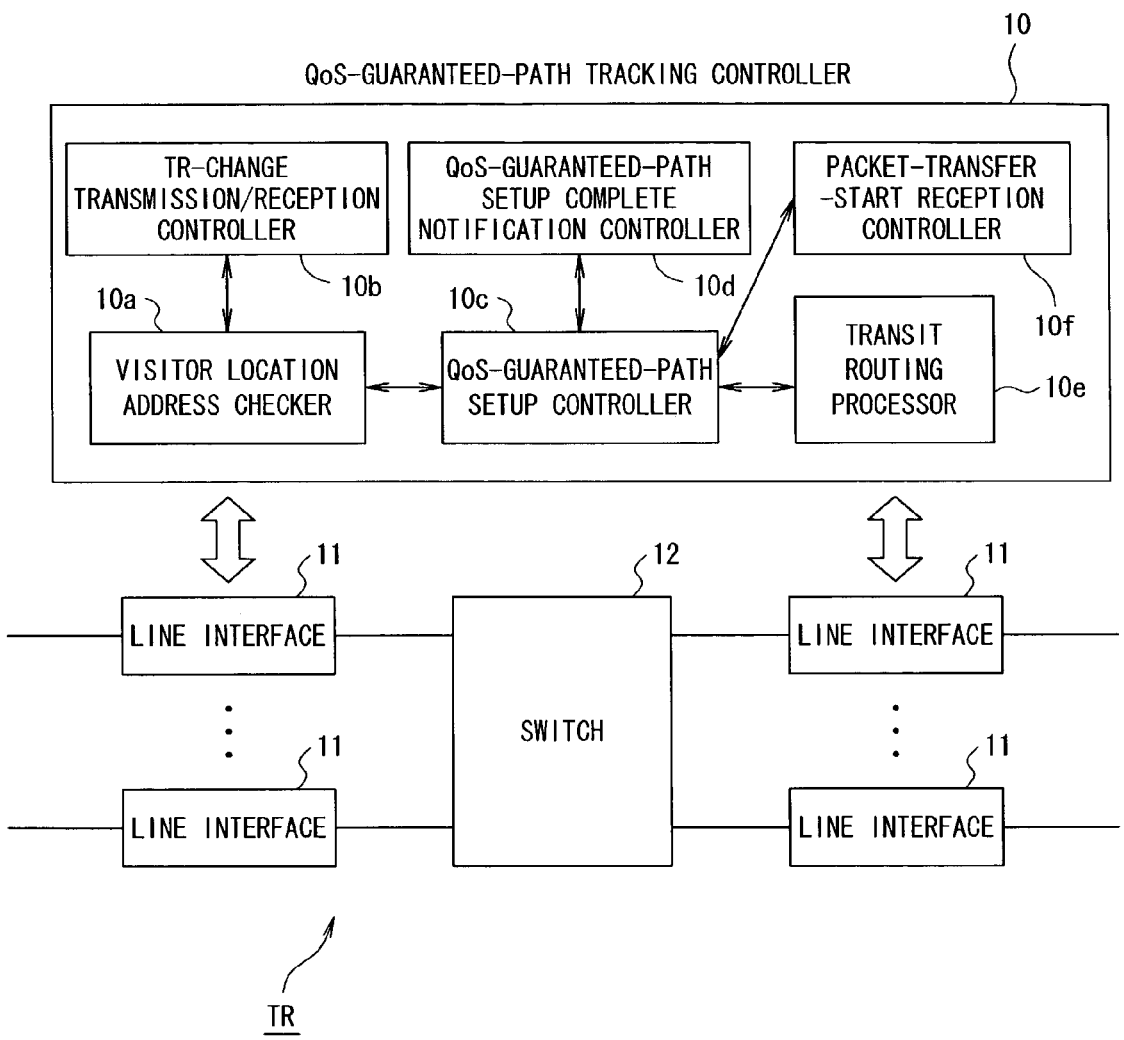
FIG. 5 is a block diagram showing an exemplary internal configuration of the transit router shown in FIG. 1.

An exemplary internal configuration of the transit router TR shown in FIG. 1 is presented in FIG. 5. Referring to FIG. 5, the transit router TR comprises a QoS-guaranteed-path tracking controller 10 which gives notification about setup of QoS guaranteed paths or about QoS guaranteed paths that have been set up, line interfaces (Line IF) 11 each of which is installed for each line and serves as a signal input/output interface for the QoS-guaranteed-path tracking controller 10, and a switch 12 for setting up a path by switching connections among the line interfaces 11.

Furthermore, the QoS-guaranteed-path tracking controller 10 comprises a visitor location address checker 10a which checks visitor location addresses, a TR-change transmission/reception controller 10b which sends and receives notification about changes of transit routers, a QoS-guaranteed-path setup controller 10c which controls setup of QoS guaranteed paths, a QoS-guaranteed-path setup complete notification controller 10d which gives notification about setup completion of QoS guaranteed paths, a transit routing processor 10e which performs routing processes, and a packet-transfer-start reception controller 10f which receives notification about the start of packet transfer.

Figure 6:
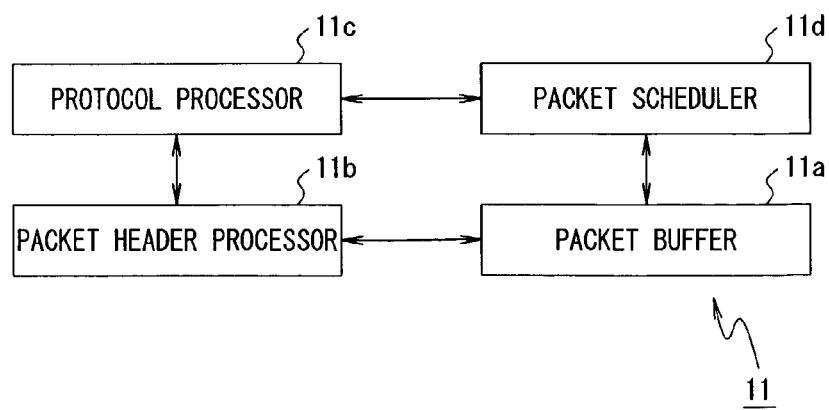
FIG. 6 is a block diagram showing an exemplary internal configuration of the line interfaces shown in FIG. 5.

The line interfaces 11 shown in FIG. 5 are configured, for example, as shown in FIG. 6. Referring to FIG. 6, each line interface 11 comprises a packet buffer 11a which buffers packets, a packet header processor 11b which processes the header of sent and received packets, a protocol processor 11c which performs protocol conversion and other processes, and a packet scheduler 11d which schedules packet deliveries and the like.

Figure 7:
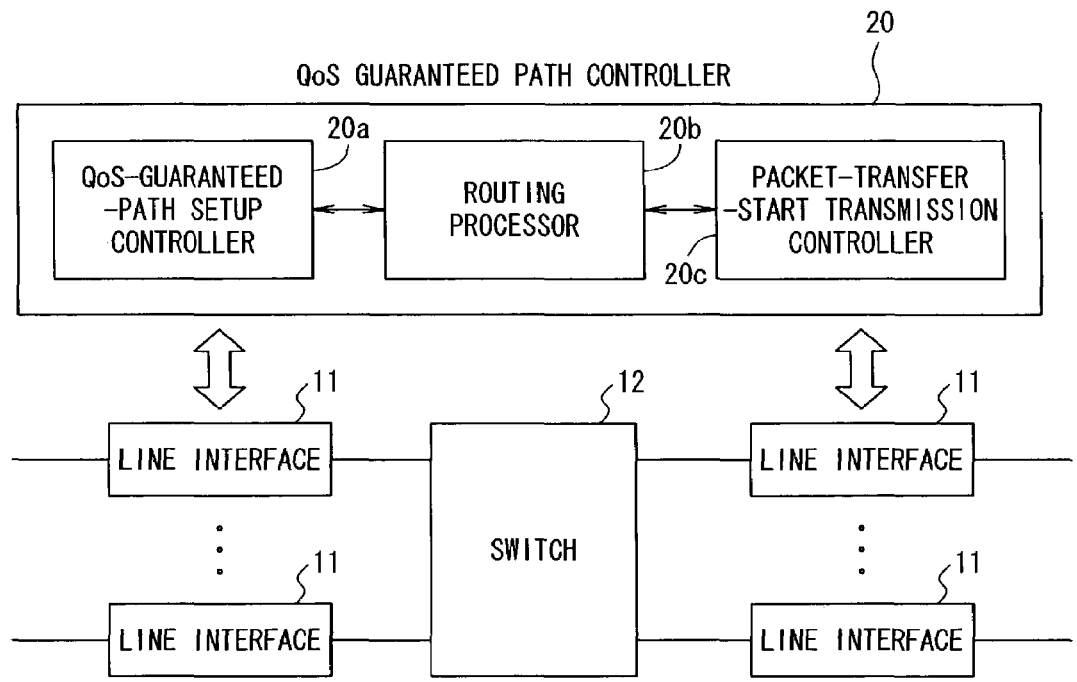
FIG. 7 is a block diagram showing an exemplary internal configuration of the edge routers shown in FIG. 1.

An exemplary internal configuration of the edge routers ER1 to ER3 shown in FIG. 1 is presented in FIG. 7. Referring to FIG. 7, each of the edge routers ER1 to ER3 comprises a QoS guaranteed path controller 20, line interfaces 11 each of which is installed for each line and serves as a signal input/output interface for the QoS guaranteed path controller 20, and a switch 12 for switching connections among the line interfaces 11.

Furthermore, the QoS guaranteed path controller 20 comprises a QoS-guaranteed-path setup controller 20a which controls setup of QoS guaranteed paths, a routing processor 20b which performs routing processes, and a packet-transfer-start transmission controller 20c which sent notification about the start of packet transfer. Regarding the core router CR shown in FIG. 1, the configuration in FIG. 7 can be used by removing the packet-transfer-start transmission controller 20c.

The line interfaces 11 have the same configuration as those shown above in FIG. 6.

Figure 8:
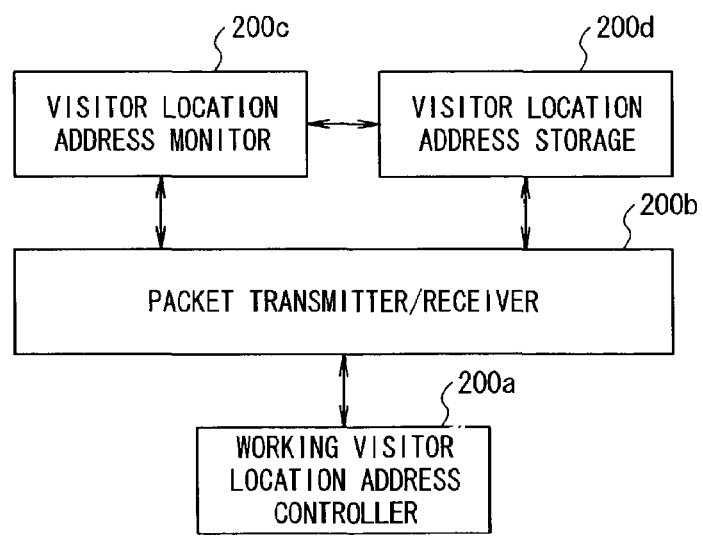
FIG. 8 is a block diagram showing a configuration example of the mobile communications terminal shown in FIG. 1.

A configuration example of the mobile communications terminal 200 shown in FIG. 1 is presented in FIG. 8. As shown in FIG. 8, the mobile communications terminal 200 comprises a working visitor location address controller 200a which controls the visitor location address used, a packet transmitter/receiver 200b which sends and receives packets, a visitor location address monitor 200c which monitors any change of visitor location address, and a visitor location address storage 200d which stores the current visitor location address.

Figure 9:
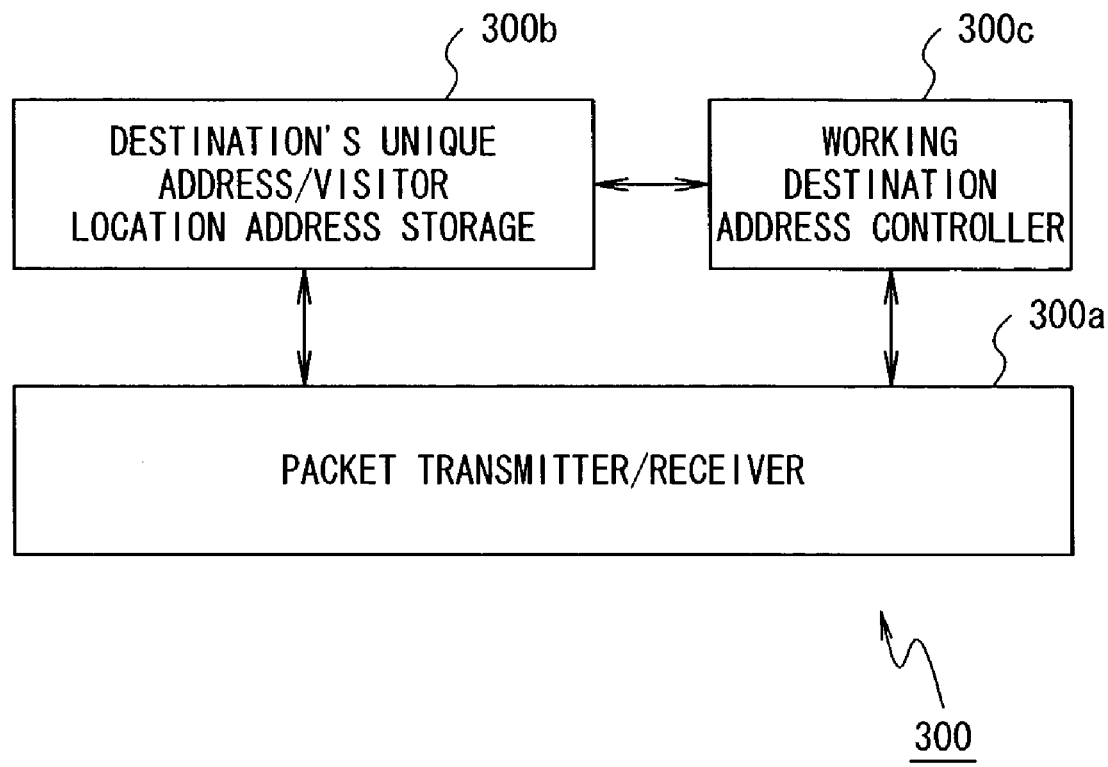
FIG. 9 is a block diagram showing a configuration example of the remote terminal shown in FIG. 1.

A configuration example of the remote terminal 300 shown in FIG. 1 is presented in FIG. 9. As shown in FIG. 9, the remote terminal 300 comprises a packet transmitter/receiver 300a which sends and receives packets, a destination's unique address/visitor location address storage 300b which stores a table containing correspondence between addresses unique to mobile communications terminals and visitor location addresses, and a working destination address controller 300c which controls destination addresses used.

Since this system with the above configuration can control upstream and downstream packet transfer paths when the mobile communications terminal moves into an area where the coverage areas of edge routers overlap, it can always guarantee QoS and can achieve continuity of QoS guaranteed paths for upstream and downstream packet transfers. Furthermore, the overlapping segment between the packet transfer paths before and after movement of the mobile communications terminal can be reused as an existing QoS guaranteed path after the movement, making it possible to reduce the length of the new QoS guaranteed path required as a result of the movement. This in turn makes it possible to reduce the time required to set up a new QoS guaranteed path and consequently to track QoS guaranteed paths even when the mobile communications terminal is moving at a high speed.

SECOND EXAMPLE

Figure 10:
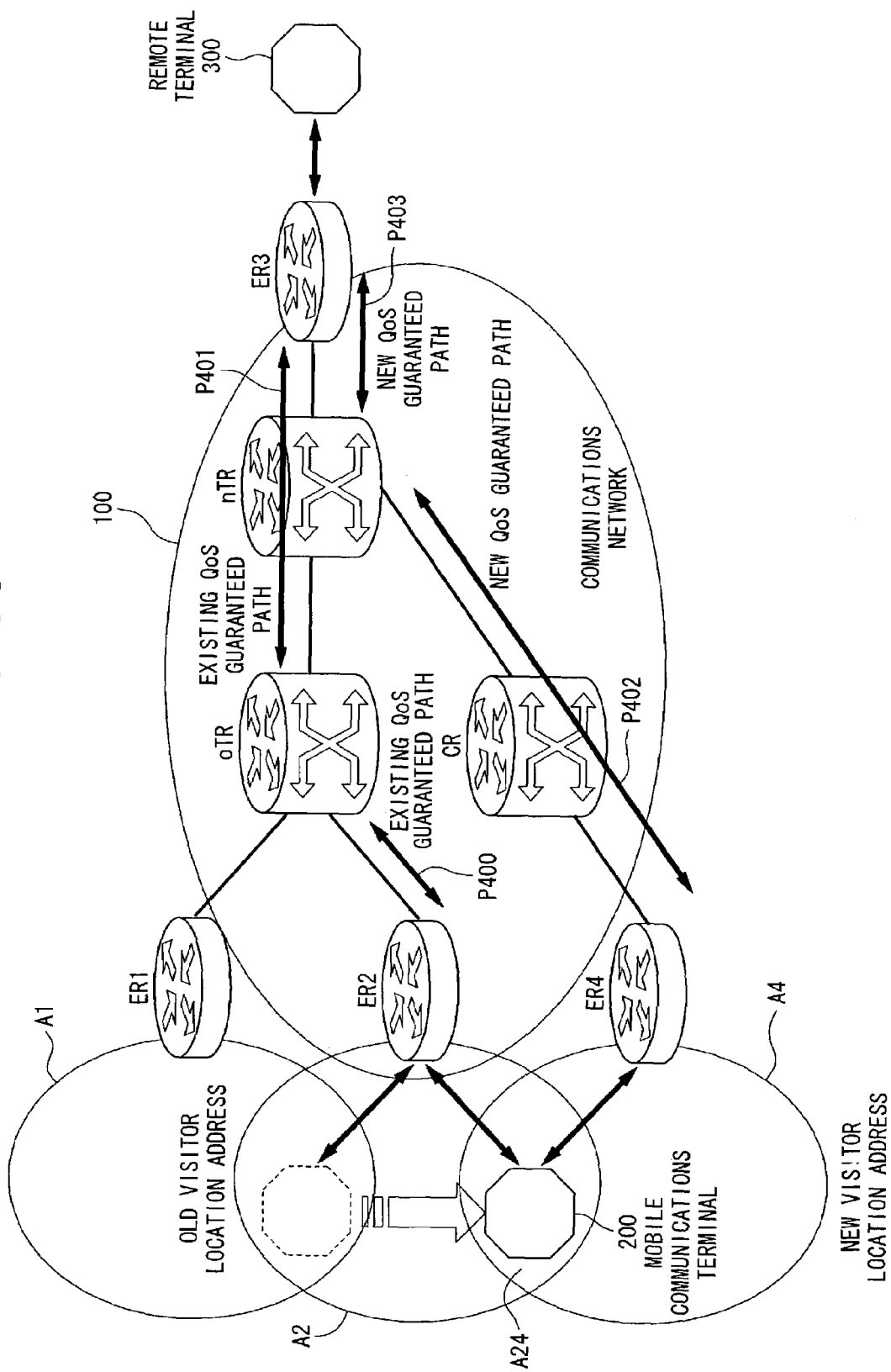
FIG. 10 is a block diagram showing a configuration of a second example of a mobile tracking system for QoS guaranteed paths according to the present invention.

FIG. 10 is a block diagram showing a configuration of a second example of a mobile tracking system for QoS guaranteed paths according to the present invention.

Referring to FIG. 10, the mobile tracking system for QoS guaranteed paths according to this example carries out packet transfer, through a network 100, between a mobile communications terminal 200 and a remote terminal 300, each comprising packet transfer control capabilities. The network 100 according to this example comprises transit routers oTR and nTR, a core router CR, and edge routers ER1 to ER4.

The edge router ER1, which belongs to a visitor location area A1, sends and receives packets to/from a mobile communications terminal in the visitor location area A1. The edge router ER2, which belongs to a visitor location area A2, sends and receives packets to/from a mobile communications terminal in the visitor location area A2. The edge router ER4, which belongs to a visitor location area A4, sends and receives packets to/from a mobile communications terminal in the visitor location area A4. The edge router ER3 sends and receives packets to/from the remote terminal. The internal configurations of the transit routers oTR and nTR, core router CR, and edge routers ER1 to ER4 are the same as those described above with reference to FIGS. 5 to 9.

In this system with the above configuration, the setup process of QoS guaranteed paths before a handover is similar to that of the first example and sets up QoS guaranteed paths P400 and P401. When the mobile communications terminal 200 moves to an area A24 where the coverage areas of the edge routers ER2 and ER4 overlap and receives information about a new visitor location address from the edge router ER4 which belongs to the new visitor location area it moved to, it transfers an upstream packet which contains a location registration update request and desired QoS parameter using the old visitor location address used before the movement while storing the new visitor location address.

The packet received by the edge router ER2 which belongs to the old visitor location area is transferred via existing QoS guaranteed paths. By checking the new visitor location address contained in the packet, the old transit router oTR which relays this packet can judge whether the mobile communications terminal 200 is traveling in the service area of the transit router oTR. When it is confirmed that the movement of the mobile communications terminal 200 is taking place in its boundary service area, the old transit router oTR notifies a new transit router nTR, a prospective next transit router, about a change of transit router instead of starting to set up a new QoS guaranteed path.

Upon receiving the change-of-transit-router notification, the new transit router nTR sends out a new-QoS-guaranteed-path setup request to the edge router ER4 which belongs to the new visitor location area and the edge router ER3 of the remote terminal, and then starts setting up a new QoS guaranteed path.

If the remote terminal 300 has not received a new-QoS-guaranteed-path setup complete notification from the new transit router nTR by the time it receives the upstream packet which contains a location registration update request and QoS parameter from the mobile communications terminal 200, it temporarily stores the new visitor location address contained in the packet and uses existing QoS guaranteed paths to transfer downstream packets. Upon receiving a new-QoS-guaranteed-path setup acknowledgment from the edge router ER4 which belongs to the new visitor location area and the edge router ER3 of the remote terminal, the new transit router nTR recognizes that the new QoS guaranteed path has been set up and sends a setup complete notification to the mobile communications terminal 200 and the remote terminal 300.

Upon receiving the setup complete notification, the mobile communications terminal 200 transfers an upstream packet via the new QoS guaranteed path using the new visitor location address. On the other hand, upon receiving the setup complete notification, the remote terminal 300 updates its own table containing correspondence between the address unique to the mobile communications terminal 200 and visitor location address and transfers a downstream packet via the new QoS guaranteed path.

Figure 11:
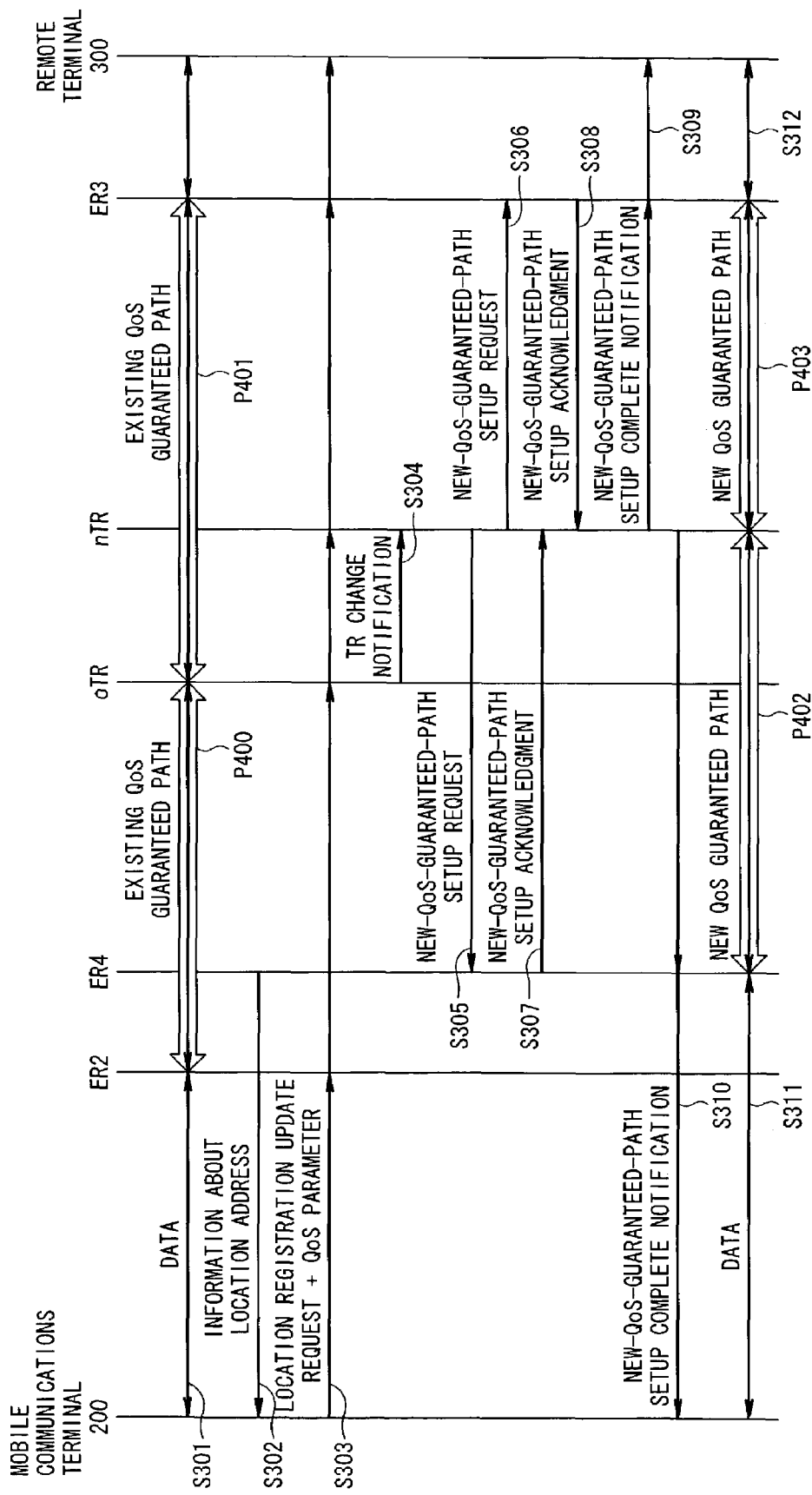
FIG. 11 is a sequence diagram showing operations performed by components of the system shown in FIG. 10 when a handover takes place.

Operations performed in this system will be described further with reference to FIG. 11 as well. In FIG. 11, the mobile communications terminal 200 and remote terminal 300 transmit data by sending and receiving a packet S301 via the existing QoS guaranteed paths P400 and P401.

In this state, when the mobile communications terminal 200 moves into the area where the coverage areas of the edge routers ER2 and ER4 overlap, it receives information S302 about a new visitor location address from the edge router ER4 belonging to the new visitor location area it moved to, it stores the new visitor location address. And the mobile communications terminal 200 transfers an upstream packet S303 which contains a location registration update request and desired QoS parameter using the old visitor location address used before the movement.

The packet S303 received by the edge router ER2 which belongs to the old visitor location area is transferred via the existing QoS guaranteed paths P400 and P401. By checking the new visitor location address contained in the packet S303, the old transit router oTR which relays this packet judges whether the mobile communications terminal 200 is traveling in the service area of the transit router oTR. When it is confirmed that the movement of the mobile communications terminal 200 is taking place in its boundary service area, the old transit router oTR does not start setting up a new QoS guaranteed path, but gives a change notification S304 to a new transit router nTR, a prospective next transit router, notifying the latter that the relaying transit router is changed.

Upon receiving the change-of-transit-router notification S304, the new transit router nTR sends out new-QoS-guaranteed-path setup requests S305 and S306 to the edge router ER4 which belongs to the new visitor location area and the edge router ER3 of the remote terminal, respectively, and starts setting up a new QoS guaranteed path.

If the remote terminal 300 has not received a new-QoS-guaranteed-path setup complete notification from the new transit router nTR by the time it receives the upstream packet S303 which contains a location registration update request and QoS parameter from the mobile communications terminal 200, it temporarily stores the new visitor location address contained in the packet S303 and uses the existing QoS guaranteed paths P400 and P401 to transfer downstream packets.

Upon receiving new-QoS-guaranteed-path setup acknowledgments S307 and S308, respectively, from the edge router ER4 which belongs to the new visitor location area and the edge router ER3 of the remote terminal, the new transit router nTR recognizes that the new QoS guaranteed path has been set up and sends setup complete notifications S309 and S310 to the remote terminal 300 and the mobile communications terminal 200, respectively.

Upon receiving the setup complete notification S310, the mobile communications terminal 200 transfers an upstream packet S311 via new QoS guaranteed paths P402 and P403 using the new visitor location address. On the other hand, upon receiving the setup complete notification S309, the remote terminal 300 updates its own table containing correspondence between the address unique to the mobile communications terminal 200 and visitor location address and transfers a downstream packet S312 via the new QoS guaranteed paths P402 and P403.

This system with the above configuration also can always guarantee QoS and can achieve continuity of QoS guaranteed paths for upstream and downstream packet transfers.

THIRD EXAMPLE

Figure 12:
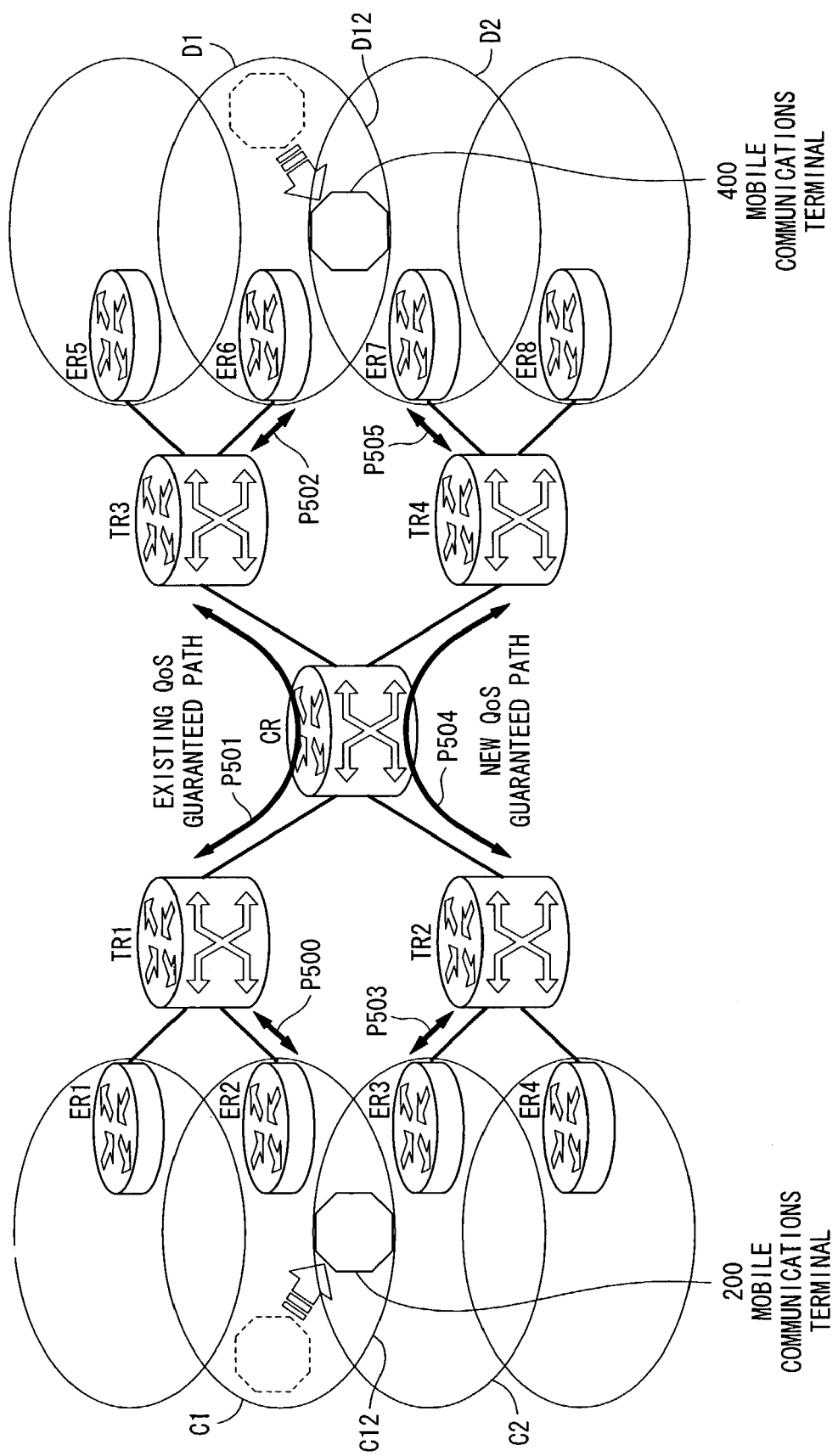
FIG. 12 is a block diagram showing a configuration of a third example of a mobile tracking system for QoS guaranteed paths according to the present invention.
Figure 13:
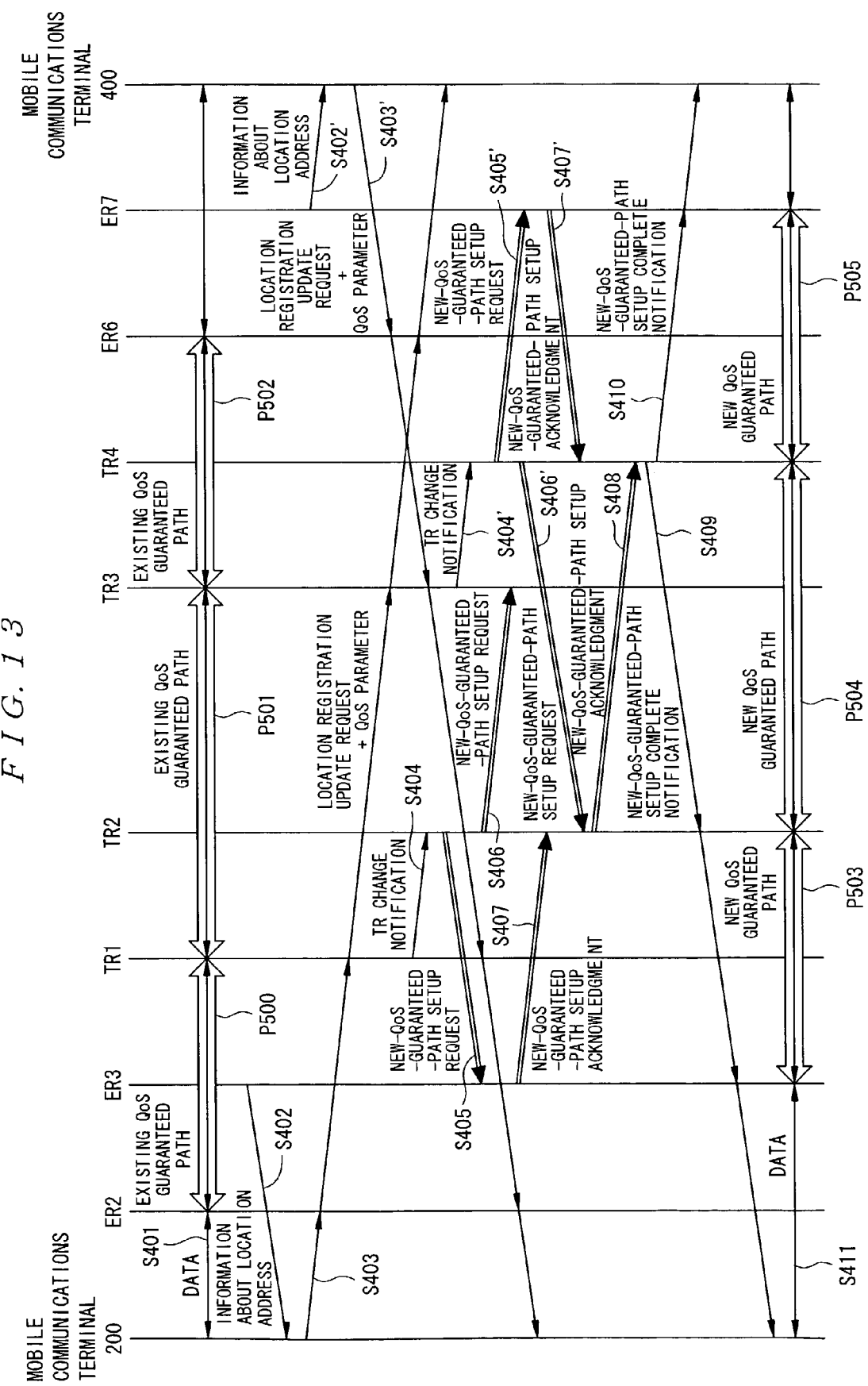
FIG. 13 is a sequence diagram showing operations performed by components of the system shown in FIG. 12 when a handover takes place.

FIG. 12 is a block diagram showing a configuration of a third example of a mobile tracking system for QoS guaranteed paths according to the present invention. FIG. 13 is a sequence diagram showing operations of system components. In this system, the setup process of QoS guaranteed paths before a handover is similar to that of the first example and sets up QoS guaranteed paths P500, P501, and P502.

In FIG. 12, when the mobile communications terminal 200 and a mobile communications terminal 400 are communicating via the existing QoS guaranteed paths P500, P501, and P502 already set up, new QoS guaranteed paths P503, P504, and P505 are set up after movements of the mobile communications terminal 200 and mobile communications terminal 400. In the figure, the mobile communications terminal 200 moves to an area C12 where the coverage area C1 of the edge router ER2 and the coverage area C2 of the edge router ER3 overlap while almost at the same time the mobile communications terminal 400 moves to an area D12 where the coverage area D1 of the edge router ER6 and the coverage area D2 of the edge router ER7 overlap.

Incidentally, the existing QoS guaranteed path P500 has been set up between the edge router ER2 and transit router TR1, the existing QoS guaranteed path P501 has been set up between the transit router TR1 and transit router TR3 via the core router CR, and the existing QoS guaranteed path P502 has been set up between the transit router TR3 and edge router ER6.

Also, a new QoS guaranteed path P503 has been setup between the edge router ER3 and transit router TR2, a new QoS guaranteed path P504 has been set up between the transit router TR2 and transit router TR4 via the core router CR, and a new QoS guaranteed path P505 has been set up between the transit router TR4 and edge router ER7.

Now, operation of this system when two mobile communications terminals move almost simultaneously as shown in FIG. 12 will be described with reference to FIG. 13.

In FIG. 13, before movements, the mobile communications terminals 200 and 400 transmit data by sending and receiving a packet S401 via the existing QoS guaranteed paths P500, P501, and P502.

In this state, when the mobile communications terminal 200 moves into the area where the coverage areas C1 and C2 of the edge routers ER2 and ER3 overlap, the following operations are performed. Specifically, when the mobile communications terminal 200 receives information S402 about a new visitor location address from the edge router ER3 belonging to the new visitor location area it moved to, it stores the new visitor location address. And the mobile communications terminal 200 transfers an upstream packet S403 which contains a location registration update request and desired QoS parameter using the old visitor location address used before the movement.

The packet received by the edge router ER2 which belongs to the old visitor location area is transferred via the existing QoS guaranteed paths P500, P501, and P502. By checking the new visitor location address contained in the packet S403, the transit router TR1 which relays this packet can judge whether the mobile communications terminal 200 is traveling in the service area of the transit router TR1. When it is confirmed that the movement of the mobile communications terminal 200 is taking place in its boundary service area, the transit router TR1 gives a transit router TR2 which is a prospective next transit router a change notification S404 about a change of transit router instead of starting setting up a new QoS guaranteed path.

Upon receiving the change-of-transit-router notification S404, the transit router TR2 sends out new-QoS-guaranteed-path setup requests S405 and S406 to the edge router ER3 which belongs to the new visitor location area of the mobile communications terminal 200 and the transit router TR3 which belongs to the old visitor location area of the mobile communications terminal 400, respectively, and starts setting up a new QoS guaranteed path. Upon receiving the new-QoS-guaranteed-path setup request S405, the edge router ER3 sends a new-QoS-guaranteed-path setup acknowledgment S407 to the transit router TR2.

On the other hand, almost simultaneously with the movement of the mobile communications terminal 200, when the mobile communications terminal 400 moves into the area where the coverage areas D1 and D2 of the edge routers ER6 and ER7 overlap, the following operations are performed. Specifically, when the mobile communications terminal 400 receives information S402' about a new visitor location address from the edge router ER7 belonging to the new visitor location area it moved to, it stores the new visitor location address and transfers an upstream packet S403' which contains a location registration update request and desired QoS parameter using the old visitor location address used before the movement.

The packet received by the edge router ER6 which belongs to the old visitor location area is transferred via the existing QoS guaranteed paths P500, P501, and P502. By checking the new visitor location address contained in the packet S403', the transit router TR3 which relays this packet can judge whether the mobile communications terminal 400 is traveling in the service area of the transit router TR3. When it is confirmed that the movement of the mobile communications terminal 400 is taking place in its boundary service area, the transit router TR3 gives a transit router TR4 which is a prospective next transit router a change notification S404' about a change of transit router instead of starting setting up a new QoS guaranteed path.

The transit router TR3, which has already received the packet containing a location registration update request and desired QoS parameter from the mobile communications terminal 200, can recognize that the mobile communications terminal 200 has moved into the service area of the transit router TR2. Therefore, the change notification S404' sent out by the transit router TR3 to the transit router TR4 also contains information that a QoS guaranteed path will be set up for the transit router TR2.

Upon receiving the change notification S404', the transit router TR4 sends out new-QoS-guaranteed-path setup requests S405' and S406' to the edge router ER7 which belongs to the new visitor location area of the mobile communications terminal 400 and the transit router TR2 which belongs to the new visitor location area of the mobile communications terminal 200, respectively, and starts setting up a new QoS guaranteed path. Upon receiving the new-QoS-guaranteed-path setup request S405', the edge router ER7 sends a new-QoS-guaranteed-path setup acknowledgment S407' to the transit router TR4. Also, upon receiving the new-QoS-guaranteed-path setup request S406', the transit router TR2 sends a new-QoS-guaranteed-path setup acknowledgment S408 to the transit router TR4.

If the mobile communications terminals 200 and 400 have not received a new-QoS-guaranteed-path setup complete notification from the transit router by the time they receive the upstream packet S403 or S403' which contains the location registration update request and the desired Qos parameter, they temporarily store the new visitor location address contained in the packet S403 or S403' and use the existing QoS guaranteed paths P500, P501, and P502 to transfer downstream packets.

Upon receiving new-QoS-guaranteed-path setup acknowledgments S407' and S408, respectively, from the edge router ER7 which belongs to the new visitor location area of the mobile communications terminal 400 and the transit router TR2 of the mobile communications terminal 200, the transit router TR4 recognizes that the new QoS guaranteed path has been set up and sends setup complete notifications S409 and S410 to the mobile communications terminals 200 and 400, respectively.

Upon receiving the setup complete notifications S409 and S410, respectively, the mobile communications terminals 200 and 400 transfer an upstream packet via new QoS guaranteed paths P503, P504, and P505 using the new visitor location address. Also, the mobile communications terminals 200 and 400 update their own tables containing correspondence between addresses unique to mobile communications terminals and visitor location addresses and transfers a downstream packet via the new QoS guaranteed paths P503, P504, and P505. Thus, after the movements, the mobile communications terminals 200 and 400 transfer a packet S411 via the new QoS guaranteed paths P503, P504, and P505.

The third example described above works even when the remote terminal is a mobile terminal, i.e., it can keep QoS guaranteed paths established even between mobile terminals.

(Router Device and Control Program for Controlling Router Device)

Incidentally, the above system employs a router device for carrying out packet transfer via QoS guaranteed paths between a first communications terminal and a second communications terminal at least one of which is a mobile terminal, comprising: detection means for detecting any change of visitor location address reported via an existing QoS guaranteed path used for the packet transfer; and QoS guaranteed path setup means for newly setting up a QoS guaranteed path according to detection results produced by the detection means, wherein packets are transferred via the existing QoS guaranteed path until the QoS guaranteed path setup means of the router device completes setup of a QoS guaranteed path.

Also, this router device further comprises: QoS-guaranteed-path setup complete notification means for notifying the first communications terminal and the second communications terminal that the QoS guaranteed path setup means has completed setup of a QoS guaranteed path; and change notification means for sending out to another router device a notification about a change of relay instead of setting up a QoS guaranteed path by the QoS guaranteed path setup means, depending on the detection results produced by the detection means.

Besides, this router device is controlled by a control program for controlling a router device which carries out packet transfer via QoS guaranteed paths between a first communications terminal and a second communications terminal at least one of which is a mobile terminal. This control program will be described with reference to FIG. 14. In the figure, it is judged first whether a received packet contains a packet transfer start notification (Step S101). If the packet contains a packet transfer start notification, the local device sets up a new QoS guaranteed path (Step S101→S102). Then, the local device enters a wait state until a setup acknowledgment is received (Step S103). When a setup acknowledgment is received, the local device sends a QoS-guaranteed-path setup complete notification to the edge router which sent the packet transfer start notification (Step S104).

If it is judged in Step S101 that no packet transfer start notification is contained, then it is judged whether the packet contains a notification about a change of relay (a change-of-transit-router notification) (Step S101→S105). If it is judged that the packet contains a change-of-transit-router notification, the local device sets up a new QoS guaranteed path (Step S105→S106). Then, the local device enters a wait state until a setup acknowledgment is received (Step S107). When a setup acknowledgment is received, the local device notifies the first communications terminal and second communications terminal about setup completion of the QoS guaranteed path (Step S108).

If it is judged in Step S105 that no change-of-transit-router notification is contained, it is judged whether any change of visitor location address is reported via an existing QoS guaranteed path (Step S109). If it is judged that the visitor location falls within the service area of the local router device, the local device sets up a new QoS guaranteed path (Step S109→S106). Then, the local device enters a wait state until a setup acknowledgment is received (Step S107). When a setup acknowledgment is received, the local device notifies the first communications terminal and second communications terminal about setup completion of the QoS guaranteed path (Step S108).

If it is judged in Step S109 that the visitor location straddles the service area of the local router device and the service area of another router device, the local device does not set up a new QoS guaranteed path, but sends a notification about a change of relay (a change-of-transit-router notification) out to a new transit router, i.e., another transit router (Step S110). Consequently, the other transit router which receives the notification sets up a new QoS guaranteed path.

If it is judged in Step S109 that there is no change of visitor location address, the processing ends immediately.

Since this system can control upstream and downstream packet transfer paths by controlling router devices as described above when a mobile communications terminal moves into an area where the coverage areas of edge routers overlap, it can always guarantee QoS and can achieve continuity of QoS guaranteed paths for upstream and downstream packet transfers. Furthermore, the overlapping segment between the packet transfer paths before and after movement of the mobile communications terminal can be reused as an existing QoS guaranteed path after the movement, making it possible to reduce the length of the new QoS guaranteed path required as a result of the movement. This in turn makes it possible to reduce the time required to set up a new QoS guaranteed path and consequently to track QoS guaranteed paths even when the mobile communications terminal is moving at a high speed.

Figure 14:
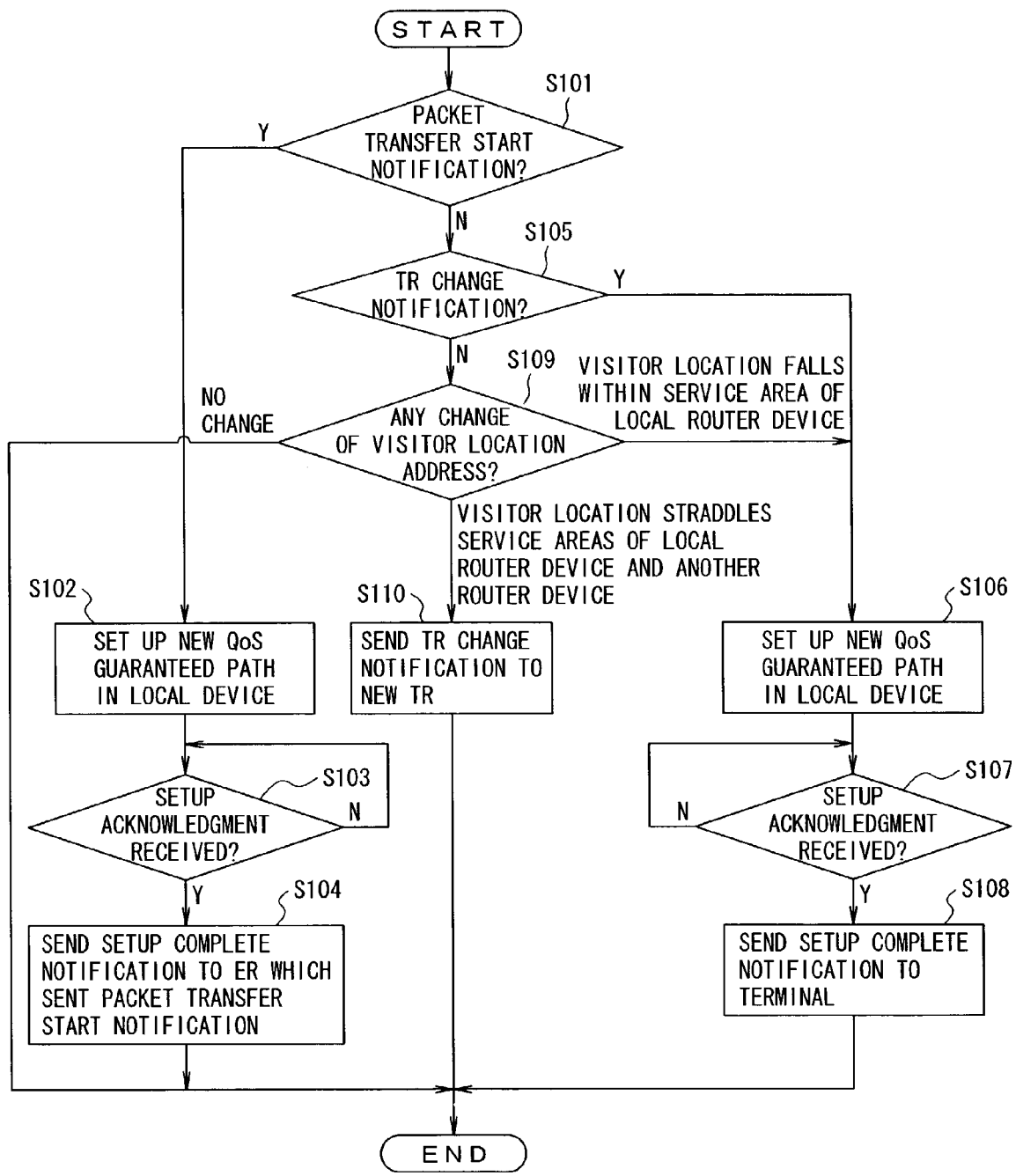
FIG. 14 is a flowchart showing processes of a control program for controlling a router device used in this system.
Figure 15:
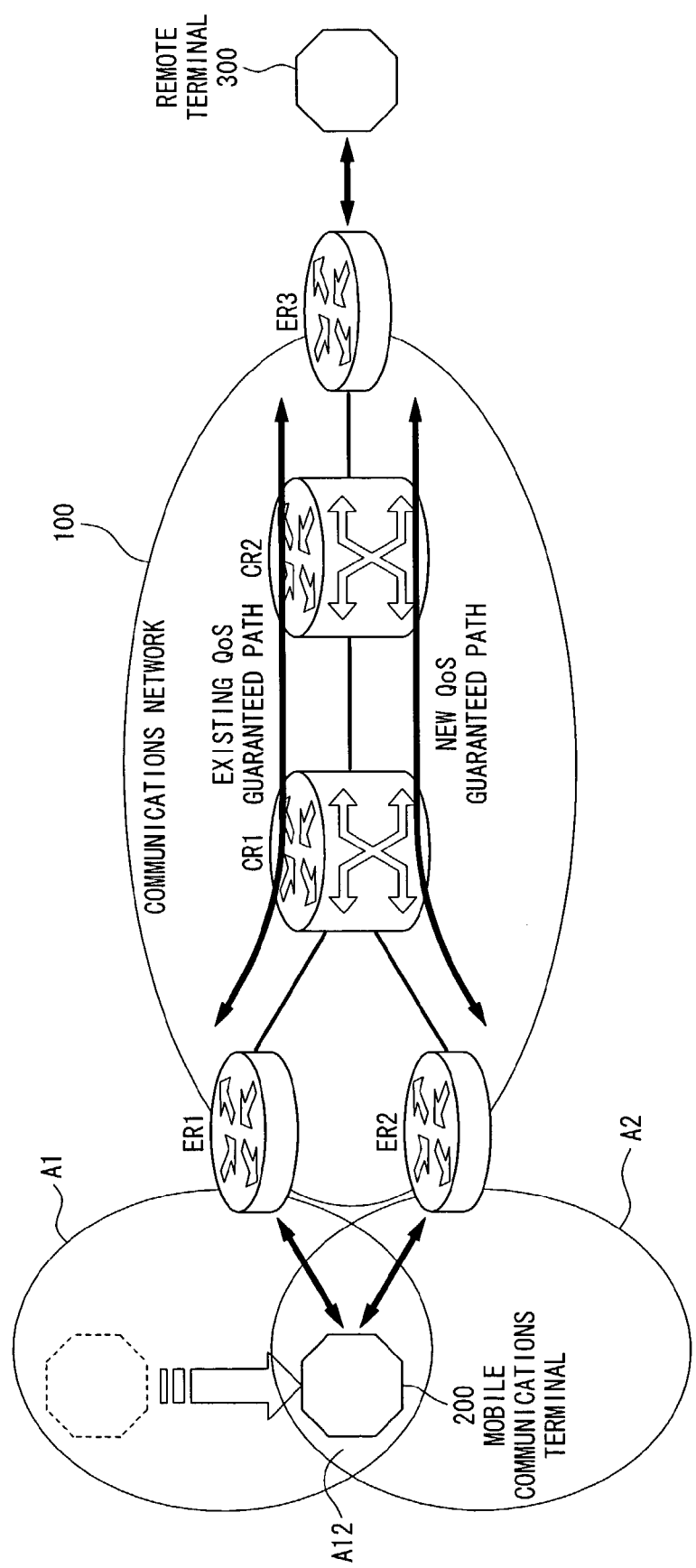
FIG. 15 is a block diagram showing a configuration of a conventional mobile tracking system for QoS guaranteed paths.
Figure 16:
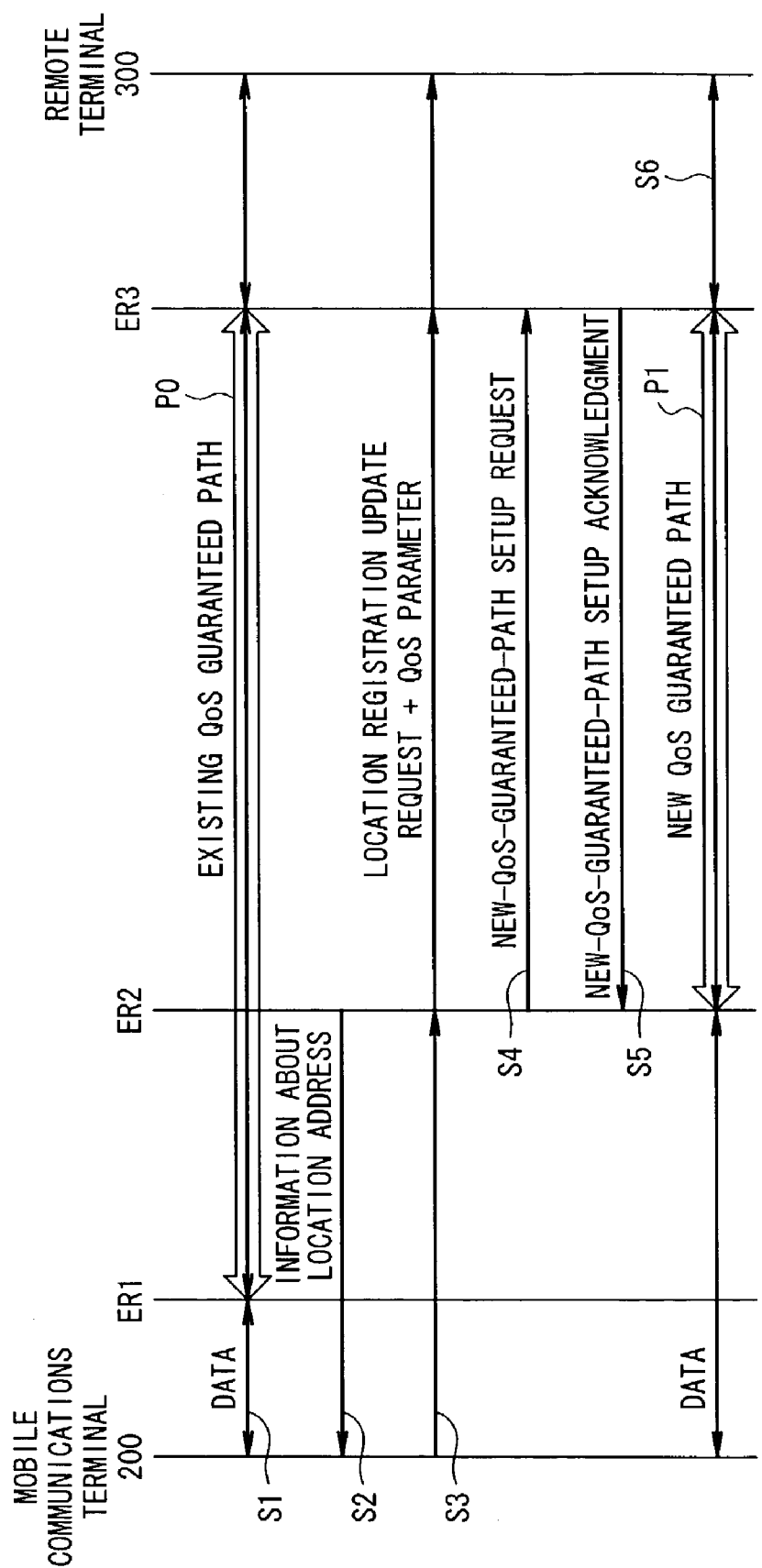
FIG. 16 is a sequence diagram showing operations performed by the components shown in FIG. 15.
Figure 17:
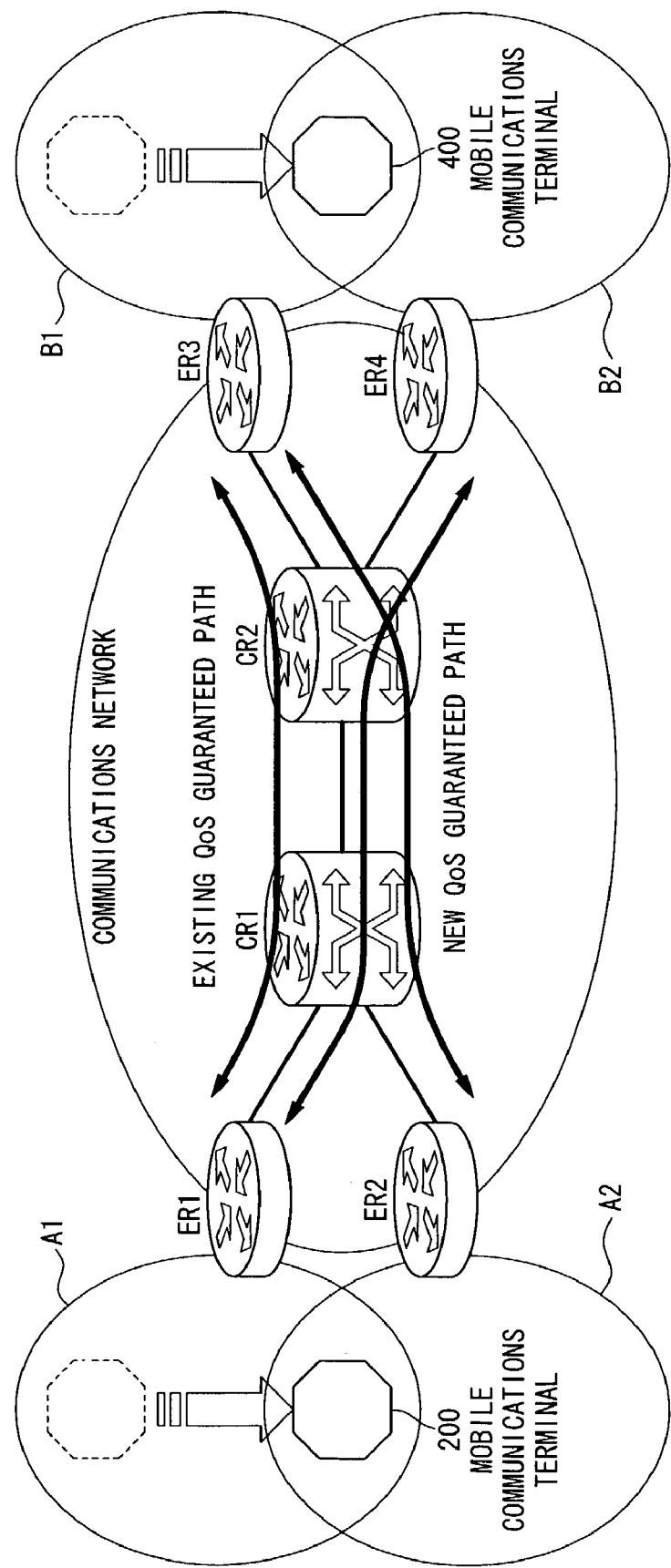
FIG. 17 is a block diagram illustrating a problem with the conventional mobile tracking system for QoS guaranteed paths.
Figure 18:
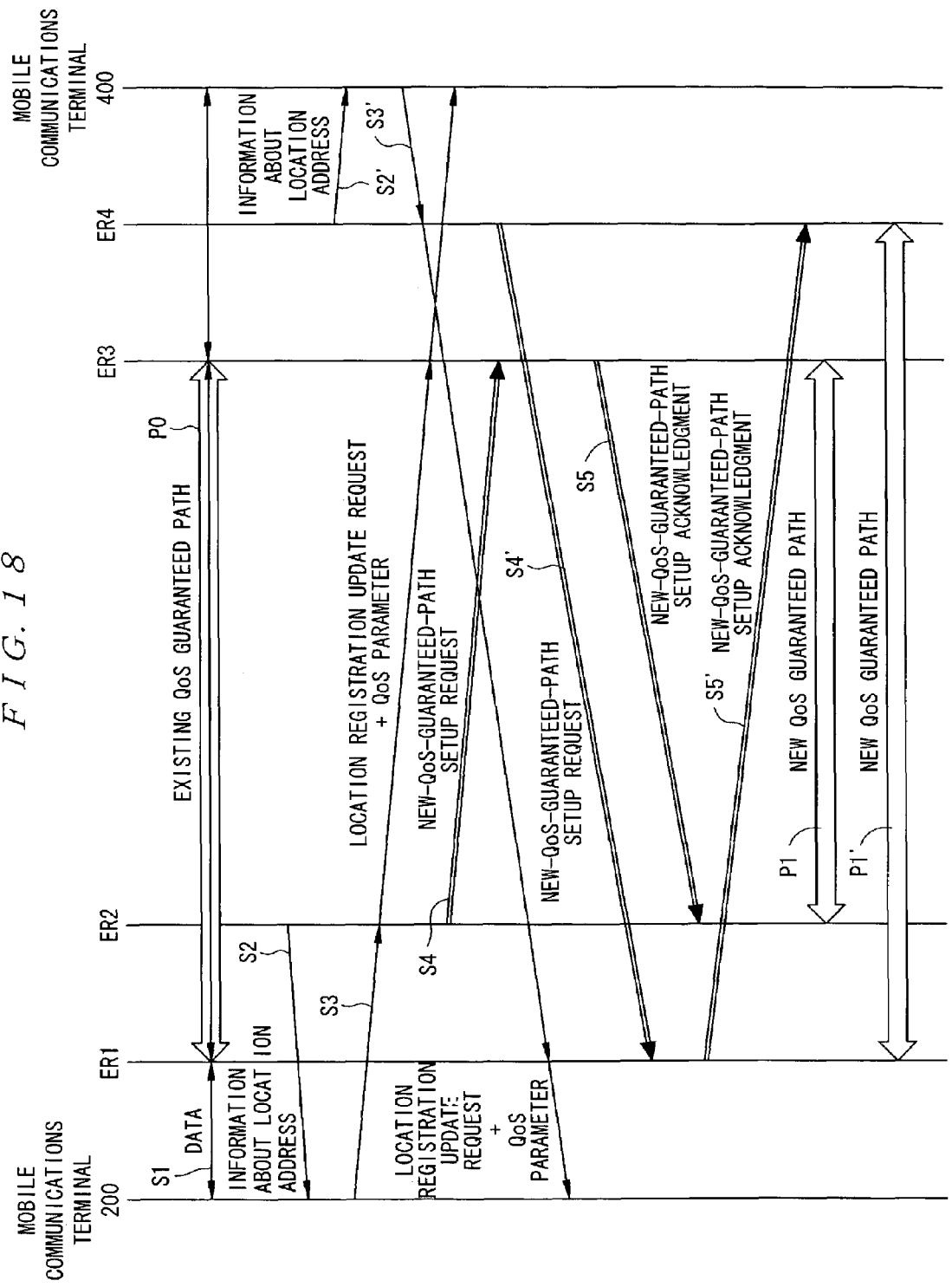
FIG. 18 is a sequence diagram showing operations performed by the components shown in FIG. 17.

Incidentally, various recording media (not shown in FIGS. 1, 10, 12, etc.) are available including a semiconductor memory, magnetic disk, and optical disk to record the control program which implements the operations shown in FIG. 14.

(System Variations)

The configuration of this system is not limited to the above examples. For example, the system may be configured as follows.

(Variation 1)

Although the operation sequences in FIGS. 2, 3, 4, 11 and 13 present examples in which a two-way QoS guaranteed path is set up at a time based on a unilateral request to set up a new QoS guaranteed path, it is also possible to set up upstream and downstream QoS guaranteed paths separately. In that case, in the example of FIG. 4, for example, the transit router TR sends out a new-QoS-guaranteed-path setup request, recognizes that setup of a new downstream QoS guaranteed path has been completed when an acknowledgment is received, and sends out a setup complete notification to the remote terminal. At the same time, the edge router ER2 sends out a new-QoS-guaranteed-path setup request, recognizes that setup of a new upstream QoS guaranteed path has been completed when an acknowledgment is received, and sends out a setup complete notification to the mobile communications terminal.

(Variation 2)

The location registration update request may be terminated at an edge router ER of the remote terminal or at a boundary router on a border with another network instead of relaying it to the remote terminal. In that case, the terminating router maintains a table containing correspondence between addresses unique to mobile communications terminals and visitor location addresses. It receives the new-QoS-guaranteed-path setup complete notification, which is sent to the remote terminal in the case of the above system, and controls the packet transfer path. Incidentally, the remote terminal always uses the address unique to the mobile communications terminal as the destination address.

(Variation 3)

Upon receiving a location registration update request addressed to the remote terminal, the transit router TR readdresses the request to a terminating router such as an edge router ER of the remote terminal or a boundary router on a border with another network.

(Variation 4)

To release a QoS guaranteed path, it is possible to use either a timer-based method which releases the path if no packet transfer takes place on that path for a preset period of time or an explicit release method which releases the path using a release signal.

(Variation 5)

The transit router TR temporarily stores a location registration update request sent out by a mobile communications terminal and sets up a new QoS guaranteed path. In this case, when the setup ends, the transit router TR relays the location registration update request to the next router and sends out a new-QoS-guaranteed-path setup complete notification only to the mobile communications terminal.

(Variation 6)

When updating the table containing correspondence between addresses unique to mobile communications terminals and visitor location addresses, a new visitor location address is added to the old visitor location address instead of overwriting the old one with the new one. This makes it possible to use new and old QoS guaranteed paths selectively or simultaneously if the terminals and routers which maintain this table are notified, for example, about the quality of a wireless link between an edge router ER and mobile communications terminal.

(Variation 7)

The transit router TR is also made to maintain a table containing correspondence between addresses unique to mobile communications terminals and visitor location addresses. To update the table, the transit router TR adds a new visitor location address to the old visitor location address instead of overwriting the old one with the new one.

(Variation 8)

The mobile communications terminal or remote terminal may support QoS guarantee capabilities (MPLS, RSVP, or the like). In that case, the mobile communications terminal or remote terminal returns an acknowledgment in response to a new-QoS-guaranteed-path setup request.

(Variation 9)

The upstream packet containing a location registration update request and desired QoS parameter sent out by a mobile communications terminal may be transferred both to the node which manages the location of the mobile communications terminal and to the remote terminal. Alternatively, it may be transferred to the remote terminal, for example, via the node which manages the location of the mobile communications terminal instead of being transferred directly to the remote terminal.

(Variation 10)

Instead of including the desired QoS parameter in the location registration update request sent out by the mobile communications terminal, a QoS guarantee parameter may be specified according to, for example, QoS parameters stipulated by a common carrier.

(Mobile Tracking Method)

This system implements a mobile tracking method, wherein: any router located in any overlapping segment between packet transfer paths before and after movement of a mobile communications terminal is defined as a transit router; and a QoS guaranteed path is set up between an edge router connected with the mobile communications terminal and the transit router as well as between the transit router and an edge router of a remote terminal.

By checking a new visitor location address contained in a location registration update request sent out by the mobile communications terminal, the transit router judges whether the mobile communications terminal is traveling in the service area of the transit router. When it is found that the movement is taking place in its service area, the transit router sends out a new-QoS-guaranteed-path setup request to an edge router which belongs to the new visitor location area and starts setting up a new QoS guaranteed path.

Alternatively, by checking a new visitor location address contained in a location registration update request sent out by the mobile communications terminal, the transit router judges whether the mobile communications terminal is traveling in the service area of the transit router. When it is found that the movement is taking place in its boundary service area, the transit router notifies a router, a prospective next transit router, about a change of transit router instead of starting setting up a new QoS guaranteed path. The router which receives this change-of-transit-router notification becomes the next transit router, sends out a new-QoS-guaranteed-path setup request to an edge router which belongs to the new visitor location area and the edge router of the remote terminal, and starts setting up a new QoS guaranteed path.

Furthermore, the transit router checks whether the setup of the new QoS guaranteed path is completed. If it is complete, the transit router notifies the mobile communications terminal and remote terminal of the completion.

Also, when the mobile communications terminal moves to an area where the coverage areas of edge routers overlap and receives information about a new visitor location address from the edge router which belongs to the new visitor location area it has moved to, it transfers a packet using the old visitor location address used before the movement while storing the new visitor location address. Only after receiving a new-QoS-guaranteed-path setup complete notification from a transit router, the mobile communications terminal transfers packets via a new QoS guaranteed path using the new visitor location address.

If the remote terminal has not received a new-QoS-guaranteed-path setup complete notification from the transit router by the time it receives a packet which contains a location registration update request from the mobile communications terminal, it temporarily stores the new visitor location address contained in the packet and uses existing QoS guaranteed paths to transfer packets. After receiving a new-QoS-guaranteed-path setup complete notification from the transit router, the remote terminal updates its own table containing correspondence between addresses unique to mobile communications terminals and visitor location addresses and transfers packets via the new QoS guaranteed path.

In relation to the claims, the present invention can have the following aspects.

(1) A mobile tracking method for QoS guaranteed paths, wherein: any router located in any overlapping segment between packet transfer paths before and after movement of a mobile communications terminal is defined as a transit router; and a QoS guaranteed path is setup between an edge router connected with the mobile communications terminal and said transit router as well as between said transit router and an edge router of a remote terminal.

(2) The mobile tracking method for QoS guaranteed paths according to claim 1, wherein: by checking a new visitor location address contained in the location registration update request sent out by the mobile communications terminal, said transit router judges whether the mobile communications terminal is traveling in the service area of said transit router; and when it is found that the movement is taking place in its service area, said transit router sends out a new-QoS-guaranteed-path setup request to an edge router which belongs to the new visitor location area and starts setting up a new QoS guaranteed path.

(3) The mobile tracking method for QoS guaranteed paths according to claim 1 or 2, wherein: by checking a new visitor location address contained in the location registration update request sent out by the mobile communications terminal, said transit router judges whether the mobile communications terminal is traveling in the service area of said transit router; when it is found that the movement is taking place in its boundary service area, said transit router notifies a router, a prospective next transit router, about a change of transit router instead of starting setting up a new QoS guaranteed path; and the router which receives this change-of-transit-router notification becomes the next transit router, sends out a new-QoS-guaranteed-path setup request to an edge router which belongs to the new visitor location area and the edge router of the remote terminal, and starts setting up a new QoS guaranteed path.

(4) The mobile tracking method for QoS guaranteed paths according to any of claims 1 to 3, wherein: said transit router checks whether the setup of the new QoS guaranteed path is completed; and if it is complete, said transit router notifies the mobile communications terminal and remote terminal of the completion.

(5) The mobile tracking method for QoS guaranteed paths according to any of claims 1 to 4, wherein: when said mobile communications terminal moves to an area where the coverage areas of edge routers overlap and receives information about a new visitor location address from the edge router which belongs to the new visitor location area it has moved to, it transfers a packet using the old visitor location address used before the movement while storing the new visitor location address; and only after receiving a new-QoS-guaranteed-path setup complete notification from a transit router, said mobile communications terminal transfers packets via a new QoS guaranteed path using the new visitor location address.

(6) The mobile tracking method for QoS guaranteed paths according to any of claims 1 to 4, wherein: if said remote terminal has not received a new-QoS-guaranteed-path setup complete notification from the transit router by the time it receives a packet which contains a location registration update request from the mobile communications terminal, it temporarily stores the new visitor location address contained in the packet and uses existing QoS guaranteed paths to transfer packets; and after receiving a new-QoS-guaranteed-path setup complete notification from the transit router, said remote terminal updates its own table containing correspondence between addresses unique to mobile communications terminals and visitor location addresses and transfers packets via the new QoS guaranteed path.

As described above, the present invention has the following advantages. By detecting any change of visitor location address reported via an existing QoS guaranteed path used for packet transfer and newly setting up a QoS guaranteed path according to the results of detection, the present invention can control upstream and downstream packet transfer paths when a mobile communications terminal moves into an area where the coverage areas of edge routers overlap, and thus it can always guarantee QoS and can achieve continuity of QoS guaranteed paths for upstream and downstream packet transfers. Besides, the overlapping segment between the packet transfer paths before and after movement of the mobile communications terminal can be reused as an existing QoS guaranteed path after the movement, making it possible to reduce the length of the new QoS guaranteed path required as a result of the movement. This in turn makes it possible to reduce the time required to set up a new QoS guaranteed path and consequently to track QoS guaranteed paths even when the mobile communications terminal is moving at a high speed. Furthermore, even when terminals communicating with each other move simultaneously, the present invention can set up QoS guaranteed paths and achieve continuity of QoS guaranteed paths.

What is claimed is:

1. A mobile tracking system for QoS guaranteed paths which carries out packet transfer via QoS guaranteed paths between a first communications terminal and a second communications terminal at least one of which is a mobile terminal, wherein
    said mobile tracking system uses a router device located in an overlapping segment between the packet transfer paths before and after movement of a communications terminal, and
    said router device comprises:
        a detection means for detecting a change of visitor location address reported via an existing QoS guaranteed path used for said packet transfer,
        a QoS guaranteed path setup means for setting up a new QoS guaranteed path extended to said overlapping segment based on the change of a visitor location address according to detection results produced by the detection means,
        a QoS-guaranteed-path setup complete notification means for notifying said first communications terminal and said second communications terminal that said QoS guaranteed path setup means has completed setup of the new QoS guaranteed path,
        a change notification means for sending out to a router device other than said router device a notification about a change of relay instead of setting up the new QoS guaranteed path using said QoS guaranteed path setup means, depending on the detection results produced by said detection means,
    a routing process means which performs routing processes, and
    a packet-transfer-start reception means which receives notification about the start of packet transfer, and transfers packets via said existing QoS guaranteed path until the QoS guaranteed path setup means of said router device completes setup of the new QoS guaranteed path, and/or said other router device sets up a separate new QoS guaranteed path.

2. The mobile tracking system for QoS guaranteed paths according to claim 1, wherein before receiving notification from said QoS-guaranteed-path setup complete notification means, said first communications terminal saves said changed visitor location address and transfers packets via said existing QoS guaranteed path.

3. The mobile tracking system for QoS guaranteed paths according to claim 1, wherein said first communications terminal associates an address unique to said second communications terminal with said changed visitor location address.

4. A router device for carrying out packet transfer via QoS guaranteed paths between a first communications terminal and a second communications terminal at least one of which is a mobile terminal, said router device locates in an overlapping segment between the packet transfer paths before and after movement of a mobile communications terminal comprising:
    a detection means for detecting a change of a visitor location address reported via an existing QoS guaranteed path used for said packet transfer;
    a QoS guaranteed path setup means for setting up a new QoS guaranteed path extending to said overlapping segment based on the change of the visitor location address according to detection results produced by the detection means,
    a QoS-guaranteed-path setup complete notification means for notifying said first communications terminal and said second communications terminal that said QoS guaranteed path setup means has completed setup of the new QoS guaranteed path,
    a change notification means for sending out to another router device a notification about a change of relay instead of setting up the new QoS guaranteed path using said QoS guaranteed path setup means, depending on the detection results produced by said detection means,
    a routing process means which performs routing processes, and
    a packet-transfer-start reception means which received notification about the start of packet transfer.

5. The router device according to claim 4, further comprising a table for setting up QoS guaranteed paths by associating addresses unique to communications terminals with visitor location addresses, wherein said router device transfers packets via said existing QoS guaranteed path until the QoS guaranteed path setup means completes setup of the new QoS guaranteed path.

* * * * *